(12) United States Patent
Zhao et al.

(10) Patent No.: US 12,141,559 B2
(45) Date of Patent: Nov. 12, 2024

(54) METHOD FOR CONSTRUCTING, RUNNING AND IMPLEMENTING CROSS-PLATFORM APPLICATION, TERMINAL, SERVER AND SYSTEM

(71) Applicant: BOE Technology Group Co., Ltd., Beijing (CN)

(72) Inventors: Zhenyan Zhao, Beijing (CN); Hongxiang Shen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 332 days.

(21) Appl. No.: 17/575,983

(22) Filed: Jan. 14, 2022

(65) Prior Publication Data
US 2022/0300262 A1  Sep. 22, 2022

(30) Foreign Application Priority Data
Mar. 18, 2021  (CN) .......................... 202110290705.1

(51) Int. Cl.
*G06F 8/41*  (2018.01)
(52) U.S. Cl.
CPC .............. *G06F 8/433* (2013.01); *G06F 8/427* (2013.01)
(58) Field of Classification Search
CPC . G06F 8/36; G06F 8/427; G06F 8/433; G06F 8/447; G06F 8/76; G06F 8/00–38
See application file for complete search history.

(56) References Cited

U.S. PATENT DOCUMENTS

| | | | | |
|---|---|---|---|---|
| 10,846,083 | B2* | 11/2020 | Hu | G06F 8/76 |
| 11,609,800 | B2* | 3/2023 | Moscatiello | G06F 8/52 |
| 2014/0047413 | A1* | 2/2014 | Sheive | G06F 8/33 |
| | | | | 717/110 |

(Continued)

FOREIGN PATENT DOCUMENTS

CN  111078278 A  4/2020

OTHER PUBLICATIONS

Napoli, Marco L. Beginning flutter: a hands on guide to app development. John Wiley & Sons, 2019. (Year: 2019).*

(Continued)

*Primary Examiner* — Matthew J Brophy
(74) *Attorney, Agent, or Firm* — IPro, PLLC

(57) ABSTRACT

Embodiments of the present application provide a method for constructing, running and implementing a cross-platform application, a terminal, a server, a system, and a non-transitory computer-readable storage medium. The method includes: obtaining a project template of the cross-platform application and information about a microprogram component corresponding to the project template of the cross-platform application, in response to an operation of selecting the project template of the cross-platform application by a user on a first platform, where the project template of the cross-platform application comprises a Flutter component based on a domain-specific language, and the Flutter component is configured to parse the microprogram component and load an interface of the microprogram component; and constructing an application on the first platform and generating an application package, based on the project template of the cross-platform application and the information about the microprogram component.

18 Claims, 17 Drawing Sheets

(56) References Cited

U.S. PATENT DOCUMENTS

| | | | |
|---|---|---|---|
| 2019/0227794 A1* | 7/2019 | Mercille | G06F 8/36 |
| 2020/0192662 A1* | 6/2020 | Hu | G06F 8/76 |
| 2022/0058063 A1* | 2/2022 | Moscatiello | G06F 9/44542 |
| 2023/0064421 A1* | 3/2023 | Mohanty | G06F 8/51 |
| 2023/0065530 A1* | 3/2023 | Mohanty | G06F 11/3068 |
| 2024/0024430 A1* | 1/2024 | Sen Gupta | A61K 9/4825 |

OTHER PUBLICATIONS

Zammetti, Frank. Practical Flutter. Berkeley, CA: Apress, 2019. (Year: 2019).*
Lamhaddab, Khalid, Mohamed Lachgar, and Khalid Elbaamrani. "Porting mobile apps from iOS to android: A practical experience." Mobile Information Systems 2019.1 (2019): 4324871. (Year: 2019).*
Escobar-Velásquez, Camilo, et al. "Enabling mutant generation for open-and closed-source Android apps." IEEE Transactions on Software Engineering 48.1 (2020): 186-208. (Year: 2020).*

* cited by examiner

METHOD FOR CONSTRUCTING, RUNNING AND IMPLEMENTING CROSS-PLATFORM APPLICATION, TERMINAL, SERVER AND SYSTEM

CROSS-REFERENCE TO RELATED APPLICATION

This application claims a priority to Chinese Patent Application No. 202110290705.1 filed on Mar. 18, 2021, the disclosure of which is incorporated in its entirety by reference herein.

TECHNICAL FIELD

The present disclosure relates to the field of Internet technologies, in particular to a method for constructing, running and implementing a cross-platform application, a terminal, a server, a system, and a non-transitory computer-readable storage medium.

BACKGROUND

With the development of mobile applications, different from the previous design concept of comprehensive application development based on service requirements, mobile application developers have begun to develop an application by using the componentization and modular technology, especially for Android and iOS system platforms, which are commonly used at present. The benefits of componentization and modular development are mainly reflected in the following four aspects: high development and debugging efficiency, strong maintainability, avoiding blockage, and easier version management.

SUMMARY

In a first aspect, the present disclosure provides a method for constructing a cross-platform application, which is applied to a server. The method includes:
  obtaining a project template of the cross-platform application and information about a microprogram component corresponding to the project template of the cross-platform application, in response to an operation of selecting the project template of the cross-platform application by a user on a first platform, where the project template of the cross-platform application includes a Flutter component based on a domain-specific language, and the Flutter component is configured to parse the microprogram component and load an interface of the microprogram component; and
  constructing an application on the first platform and generating an application package, based on the project template of the cross-platform application and the information about the microprogram component.

In a possible implementation, the microprogram component is a component in a format of an abstract syntax tree.

In a possible implementation, the obtaining the project template of the cross-platform application includes: invoking a cross-platform application script; and searching for the project template of the cross-platform application.

In a possible implementation, the obtaining the project template of the cross-platform application includes:
  invoking a cross-platform application script; and
  searching for the project template of the cross-platform application from a second platform, where the second platform is different from the first platform, and the project template of the cross-platform application belongs to the second platform.

In a possible implementation, the obtaining the project template of the cross-platform application and information about a microprogram component corresponding to the project template of the cross-platform application, in response to an operation of selecting the project template of the cross-platform application by a user on a first platform includes:
  in response to an operation of the user selecting information of the project template of the cross-platform application displayed on an interface of the first platform, obtaining the project template of the cross-platform application; and
  in response to an operation of the user selecting the information about the microprogram component displayed on an interface of the first platform, obtaining the information about the microprogram component corresponding to the project template of the cross-platform application.

In a possible implementation, the in response to an operation of the user selecting the project template of the cross-platform application displayed on an interface of the first platform, obtaining the project template of the cross-platform application includes: in response to the operation of the user selecting information of the project template of the cross-platform application displayed on the interface of the first platform, selecting the project template of the cross-platform application from a second platform, where the second platform is different from the first platform, and the project template of the cross-platform application belongs to the second platform.

In a possible implementation, the in response to an operation of the user selecting the information about the microprogram component displayed on an interface of the first platform, obtaining the information about the microprogram component corresponding to the project template of the cross-platform application includes: in response to the operation of the user selecting the information about the microprogram component displayed on the interface of the first platform, obtaining the information about the microprogram component corresponding to the project template of the cross-platform application from a second platform, where the second platform is different from the first platform, and the project template of the cross-platform application belongs to the second platform.

In a possible implementation, the method further includes: obtaining a native component corresponding to the project template of the cross-platform application, where the constructing an application on the first platform based on the project template of the cross-platform application and the information about the microprogram component includes: constructing the application on the first platform based on the project template of the cross-platform application, the information about the microprogram component, and the native component.

In a possible implementation, the obtaining the native component corresponding to the project template of the cross-platform application includes: searching and obtaining the native component from a second platform, where the second platform is different from the first platform, and the project template of the cross-platform application belongs to the second platform.

In a possible implementation, the obtaining the native component corresponding to the project template of the cross-platform application includes:

displaying a list of pre-stored native components on the first platform; and obtaining the native component, in response to an operation of the user selecting the native component from the list of native components.

In a possible implementation, for a cross-platform application running on an Android system, the obtaining a project template of the cross-platform application and information about a microprogram component corresponding to the project template of the cross-platform application; and constructing an application on the first platform and generating an application package, based on the project template of the cross-platform application and the information about the microprogram component includes:

obtaining and modifying a project template file of the project template of the cross-platform application, and writing a native component dependency parameter;

writing a name of the cross-platform application, obtaining a file of a home interface of the cross-platform application, and modifying a name of the file of the home interface;

extracting and downloading a Flutter component dependency, and writing a microprogram component dependency parameter; and constructing the application and generating the application package.

In a second aspect, the present disclosure provides a method for running a cross-platform application, applied to a terminal, including:

downloading and installing an application package to generate an application, in response to an operation on the application package from a user, where the application package is constructed based on a project template of the cross-platform application and information about a microprogram component corresponding to the project template of the cross-platform application, and the project template of the cross-platform application includes a Flutter component based on a domain-specific language;

running the application on the terminal, and loading an application interface of the application; and in response to an operation on a microprogram control unit displayed on the application interface from the user, downloading, by the Flutter component, the microprogram component based on the information about the microprogram component, parsing the microprogram component and loading an interface of the microprogram component.

In a possible implementation, the information about the microprogram component is included in an entrance configuration file, and the method further includes: when running the application on the terminal, parsing, by the Flutter component, the entrance configuration file and loading the home interface of the application.

In a possible implementation, the microprogram component is a component in a format of an abstract syntax tree.

In a third aspect, the present disclosure provides a method for implementing a cross-platform application, including:

obtaining a project template of the cross-platform application and information about a microprogram component corresponding to the project template of the cross-platform application, in response to an operation of selecting the project template of the cross-platform application by a user on a first platform, where the project template of the cross-platform application includes a Flutter component based on a domain-specific language;

constructing an application on the first platform and generating an application package, based on the project template of the cross-platform application and the information about the microprogram component;

downloading and installing the application package to generate the application, in response to an operation on the application package from the user;

running the application, and loading an application interface of the application; and in response to an operation on a microprogram control unit displayed on the application interface from the user, downloading, by the Flutter component, the microprogram component based on the information about the microprogram component, parsing the microprogram component and loading an interface of the microprogram component.

In a fourth aspect, the present disclosure provides a server, including: a memory, a processor, and a program stored on the memory and executable on the processor, where, when executing the program, the processor is configured to perform steps of the method for constructing a cross-platform application.

In a possible implementation, the microprogram component is a component in a format of an abstract syntax tree.

In a fifth aspect, the present disclosure provides a terminal, including: a memory, a processor, and a program stored on the memory and executable on the processor, where, when executing the program, the processor is configured to perform steps of the method for running a cross-platform application.

In a sixth aspect, the present disclosure provides a system for implementing a cross-platform application, including a memory, a processor, and a program stored in the memory and capable of running on the processor, where, when the program is executed, the processor is configured to perform steps of the method for implementing a cross-platform application.

In a seventh aspect, the present disclosure provides a non-transitory computer-readable storage medium, where a computer program is stored thereon, where the program, when executed by a processor, causes the processor to implement steps of the method in the first aspect or the second aspect.

BRIEF DESCRIPTION OF THE DRAWINGS

In order to clearly illustrate the technical solutions of the embodiments of the present disclosure, the drawings to be used in the description of the embodiments of the present disclosure will be described briefly below. Obviously, the drawings in the following description are merely some embodiments of the present disclosure. For a person of ordinary skill in the art, other drawings can also be obtained according to these drawings without the inventive labor.

FIG. 5 shows a prototype diagram of a microprogram center in a cross-platform application open platform according to an embodiment of the present disclosure.

FIG. 6 shows a prototype diagram of a query page for microprogram component details in a cross-platform application open platform according to an embodiment of the present disclosure.

DETAILED DESCRIPTION

Figure 1:
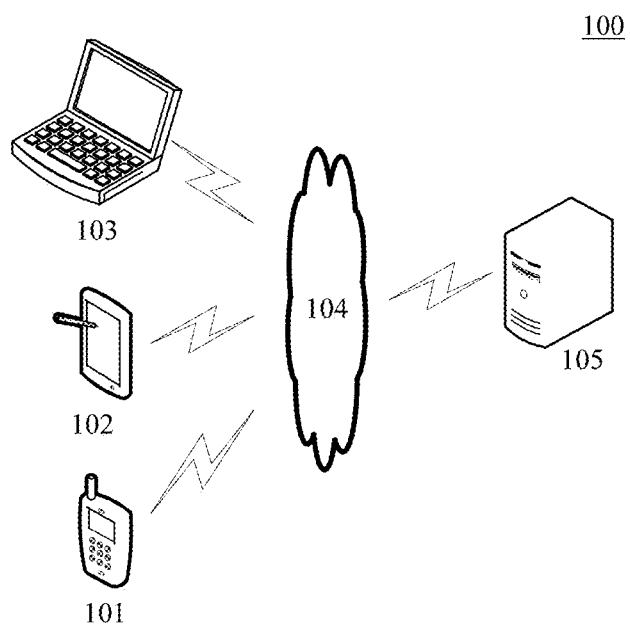
FIG. 1 shows an exemplary architecture diagram of a system according to an embodiment of the present disclosure.

To illustrate a technical problem to be solved, technical solutions and advantages in embodiments of the present disclosure more clearly, embodiments of the present disclosure will be clearly and completely described below in conjunction with drawings in the embodiments of the present disclosure. It is apparent that the described embodiments are part of not all of the embodiments of the present disclosure. All other embodiments obtained by a person of ordinary skill in the art based on the described embodiments of the present disclosure without departing from the scope of the present disclosure shall fall within the scope of the present disclosure.

It is appreciated that embodiments of the present disclosure and features in the embodiments can be combined with each other without conflicts. The present disclosure will be described in detail below with reference to the drawings and in conjunction with the embodiments.

At present, due to the componentization and modularization technology is still in an early stage, there are still certain problems in the disassembly and development of componentization and modular services of a mobile application, and in the maintenance, reuse, automated construction, and continuous integration in the later stage of development. The development usually requires the actual research and development investment for multiple teams targeting different mobile platforms, multiple independent mobile applications are developed, and run on different mobile platforms, which have similar functions. In the engineering projects, the development redundancy may be caused for the application development, which results in a multiplier increase in the componentization and modularization workload of multiple system platforms of mobile terminals, and forms a greater obstacle to the application development.

It should be noted that componentization and modularization are originated from the application development, and are now gradually applied to UI (User Interface) designs. Componentization refers to extracting repetitive codes and merging them into individual components. The most important advantage of componentization is reuse (multiplexed). Component are located at the bottom of a framework. Other functions are dependent on components and may be called or invoked by different functions at any time. In other words, the component has high independence.

Modularity is defined as isolating (packaging) a code belonging to a same function/service into an independent module, which can be run independently. Modules of different levels may be divided according to pages, functions or other different granularities. The modules are located in a service framework layer. A module is called through an interface between modules, and the purpose is to reduce the coupling between the modules. The coupling between a main application and a module gradually develops into the coupling between the main application and the interface, and the coupling between the interface and the module. It is appreciated that a module is like a power bank with multiple USB sockets, and can be connected to different mobile phones (main applications) through different USB plugs (interfaces). The USB plugs (interfaces) can be plugged and unplugged at will. It can be seen that the module has strong reusability, and each module can be independently managed.

The benefits of componentization and modular development are mainly reflected in the following four aspects: high development and debugging efficiency, strong maintainability, avoiding blockage, and easier version management. Specifically, as an application has more and more functions, a code structure becomes more and more complicated, if a small function is required to be modified, the entire application code requires to be reviewed, and all the same codes require to be modified uniformly, resulting in a large waste of time cost and labor cost, and causing a low efficiency. By using the componentization technology to call a same component for each same functional structure, when a small function is modified, only the component corresponding to the function needs to be modified to realize the global modification, which can effectively improve the efficiency of development and debugging. It is also convenient for later code search and maintenance. In addition, by using modular technology to isolate codes into independent modules, each module can be run independently, and even if one module generates a bug, it will not affect normal calls or invokes of other modules. Furthermore, the use of componentization and modularization in an application developed by multiple persons in collaboration can avoid code coverage or code conflicts, making it easier to manage code versions.

The present disclosure is to provide a method for constructing, running and implementing a cross-platform application, a terminal, a server, and a system, so as to solve at least one of the problems in related technologies.

FIG. 1 shows an exemplary system architecture 100 according to an embodiment of the present disclosure, which is configured to perform the method for constructing, running and implementing a cross-platform application, or applied to the cross-platform application, or implement a device for the cross-platform application.

As shown in FIG. 1, the system architecture 100 may include terminal devices 101, 102, 103, a network 104, and a server 105. The network 104 is used to provide a medium for communication links between the terminal devices 101, 102, 103 and the server 105. The network 104 may include various connection types, such as wired and wireless communication links, or fiber optic cables.

A user may use different terminal devices 101, 102 and 103 to interact with the server 105 through the network 104, for example, receiving or sending a message. For example, the server 105 may be accessed through an application client arranged on each of the terminal devices 101, 102, 103, or through a web page. Various communication client applications can be installed on the terminal devices 101, 102, 103, such as a cross-platform application constructing application, a cross-platform application running application, a cross-platform application implementing application, a web browser application, a shopping application, a search application, an Instant messaging tool, an email client, a social platform software, etc.

Each of the terminal devices 101, 102, 103 may be hardware or software. In a case that the terminal devices 101, 102, 103 are hardware, they may be various electronic devices that have a display screen and support the construction, running or realization of a cross-platform application, which includes but not limited to smart phones, tablet computers, laptop computers and desktop computer. In a case that the terminal devices 101, 102, and 103 are software, they may be installed in the electronic devices listed above. It may be implemented as multiple software or software modules, or as a single software or a software module, which is not specifically limited herein.

The server 105 may be a server that provides various services. For example, it may include a database for storing project templates of cross-platform applications, microprogram components and information thereof (including entrance configuration files), and native components. In addition, the server 105 may also be a back-end server that provides support for constructing or running a cross-platform application on the terminal devices 101, 102, 103. The back-end server may call or invoke a corresponding cross-platform application project template and information about a microprogram component from a database to construct the cross-platform application and generate an application package, according to the cross-platform application project template selected by a user and the information about the microprogram component corresponding to the cross-platform application project template selected by the user. The back-end server may also download and parse the microprogram component and load an interface of the microprogram component, in response to a user's operation on a microprogram space displayed on a cross-platform application interface.

It should be noted that the method for constructing a cross-platform application provided by the embodiments of the present disclosure is generally executed by the server 106, and accordingly, the device for constructing a cross-platform application is generally set in the server 106.

It should be noted that the server 105 may be hardware or software. When the server 105 is hardware, it can be implemented as a distributed server cluster including multiple servers, or as a single server. When the server 105 is software, it can be implemented as multiple software or software modules, or as a single software or software module. There is no specific limitation herein.

It should be understood that the number of terminal devices, networks, or servers in FIG. 1 are merely illustrative. According to the needs of implementations, any suitable number of terminal devices, networks or servers can be designed.

Figure 2:
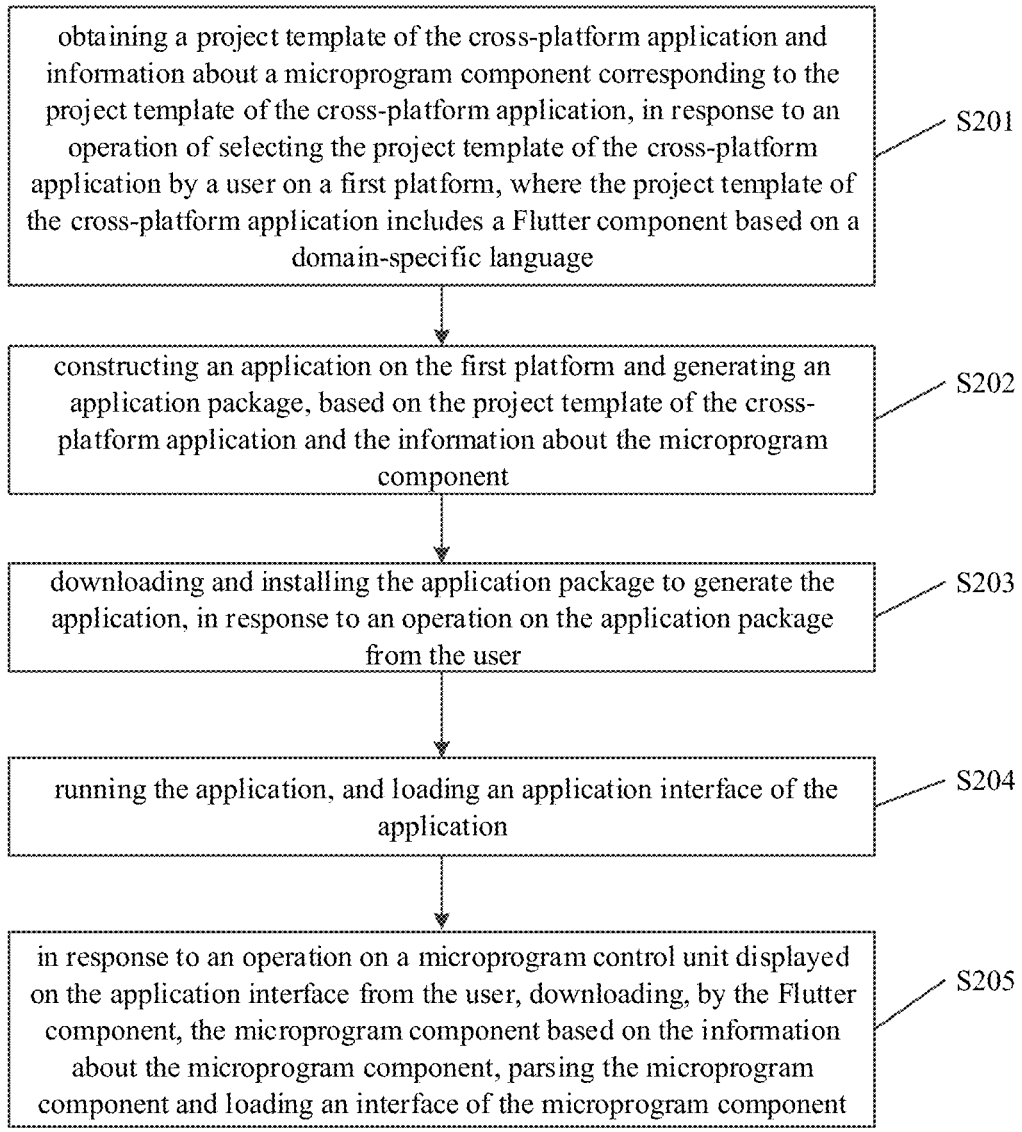
FIG. 2 shows a flowchart of a method for implementing a cross-platform application according to an embodiment of the present disclosure.

Referring to FIG. 2, FIG. 2 shows a flowchart of a method for implementing a cross-platform application according to an embodiment of the present disclosure. The method for implementing a cross-platform application includes the following steps S201 to S205.

Step S201 includes: obtaining a project template of the cross-platform application and information about a microprogram component corresponding to the project template of the cross-platform application, in response to an operation of selecting the project template of the cross-platform application by a user on a first platform, where the project template of the cross-platform application includes a Flutter component based on a domain-specific language.

The Flutter component is configured to parse the microprogram component and load an interface of the microprogram component.

In an embodiment, the cross-platform application may be, for example, a mobile application that is compatible with at least two platforms, that is, a mobile application that is able to run on two platforms, such as IOS and Android systems. In addition, domain-specific language (DSL) refers to a computer language that focuses on a certain application domain, and may also be called a domain-dedicated language. Different from a common cross-domain and general-purpose computer language (GPL), the domain-specific language can only be used in a certain domain, such as HTML used to display web pages, and Emac LISP language used by Emacs. As a mobile UI framework, a Flutter component can quickly build or construct a high-quality native user interface on multiple mobile platforms (such as IOS and Android), and the Flutter component can also work with related codes together. The microprogram component in the embodiments is a cross-platform component based on the Flutter technology, which can implement setting functions such as login and query. In an optional example, the Flutter component based on a domain-specific language may be a DSL-based Flutter interpretation framework component, which can parse a microprogram component and load an interface of the microprogram component.

In an embodiment, an execution body (for example, the server 105) that executes the cross-platform application construction method can obtain, from a local or remote network, construction parameters (including selecting which one from cross-platform application project templates and what information about the microprogram component corresponding to the selected cross-platform application project template) inputted by a developer on the terminal (such as terminal device 101, 102, 103). For example, the engineering project template of the cross-platform application may be applied to the financial field, park field, social field or shopping field, etc. Correspondingly, the microprogram component corresponding to the engineering project template in the financial field may be a microprogram component performing functions such as query, news browsing, login, etc.

In related technologies, an application development language of an Android system is mostly the Java language, and packaged application packages are in the apk format, while an application development language of an IOS system is generally Objective-C, and packaged application packages are in the ipa format. It can be seen that the Android system and the IOS system in related technologies use different general languages for application development, and the application construction processes thereof are also different, which causes formats of finally generated application packages thereof to be different, and further makes the generated application unable to be used across platforms.

In the embodiments, by using a domain-specific language (DSL) different from a common programming language (such as the programming language Java commonly used by the Android system, or the programming language Objective-C commonly used by the IOS system), a DSL-based Flutter component can be identified and analyzed in both the Android system or the IOS system, so as to realize the development of a cross-platform application.

Figure 3:
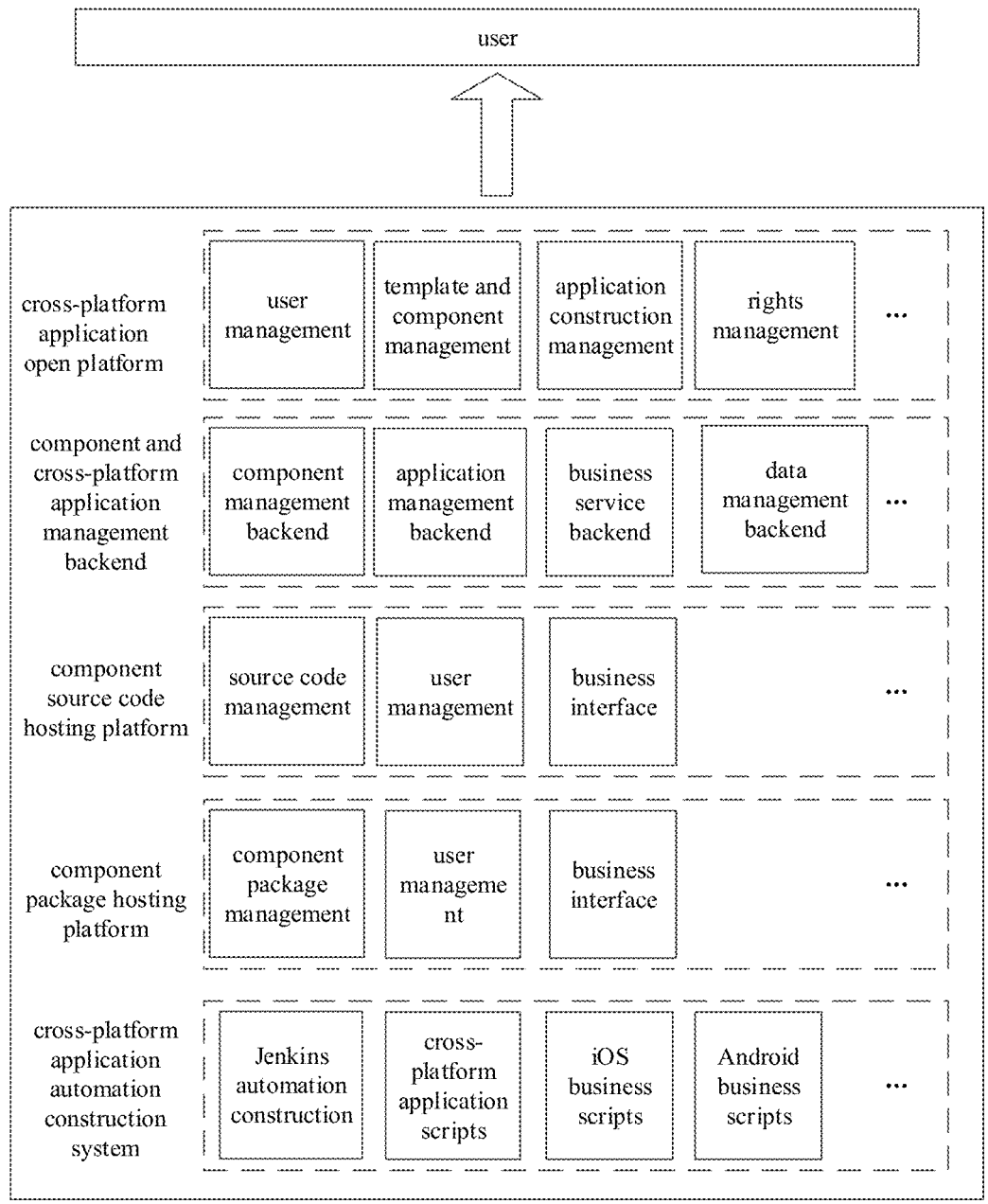
FIG. 3 shows a software structure block diagram of a server according to an embodiment of the present disclosure.

In an optional example, FIG. 3 is a block diagram of a software structure for constructing a cross-platform application in a server according to an embodiment of the present disclosure, where a software structure is divides into several layers in the layered architecture, and each layer has a clear role and a division of labor. Communications between the layers are realized through a software interface. In some embodiments, the software structure is divided into five layers, which, as shown in FIG. 3, includes a cross-platform application open platform, a component and cross-platform application management backend, a component source code hosting platform, a component package hosting platform and a cross-platform application automation construction system.

The cross-platform application open platform is used as an entrance or entrance to interact with developers, used to link developers and presents developers with service entrances such as a resource pool of microprogram components and detailed information of microprogram components. For example, an interface including microprogram components and detailed information of the microprogram components may be displayed on a terminal device of a developer. The function parts of the cross-platform application open platform are divided into user management, template and component management, application construction management, and rights management. The cross-platform application open platform is used as the entrance to the cross-platform application automation construction, and is used for configuration and management of microprogram components by customizing a service workflow in detail, and the overall service process for constructing a cross-platform application.

In addition, the cross-platform application open platform and the component and cross-platform application management backend are connected or coupled by calling a network interface, so as to invoke information (such as entrance configuration file) of a microprogram component stored in the component and cross-platform application management backend, and display the information. The cross-platform application open platform may transmits parameters inputted by a user (for example, a cross-platform application project template selected by the user, information about the microprogram component selected by the user, and an operation process of application information inputted by the user), to the component and cross-platform application management backend, and the component and cross-platform application management backend screens, filters or selects a parameter from the parameters.

The component and cross-platform application management backend is mainly configured to manage and store cross-platform applications, information and details of microprogram components, native components and cross-platform application engineering templates. The component and cross-platform application management backend is responsible for managing the stored microprogram components, information about cross-platform project template, microprogram component entrance and details, and resources and details of native components, and is configured to provide service data (microprogram components, cross-platform application project templates, and cross-platform application information) to the cross-platform application open platform, which is further provided to developers for query and use. The component and cross-platform application management backend mainly include a component management backend, an application management backend, a business service backend, and a data management backend.

Figure 4:
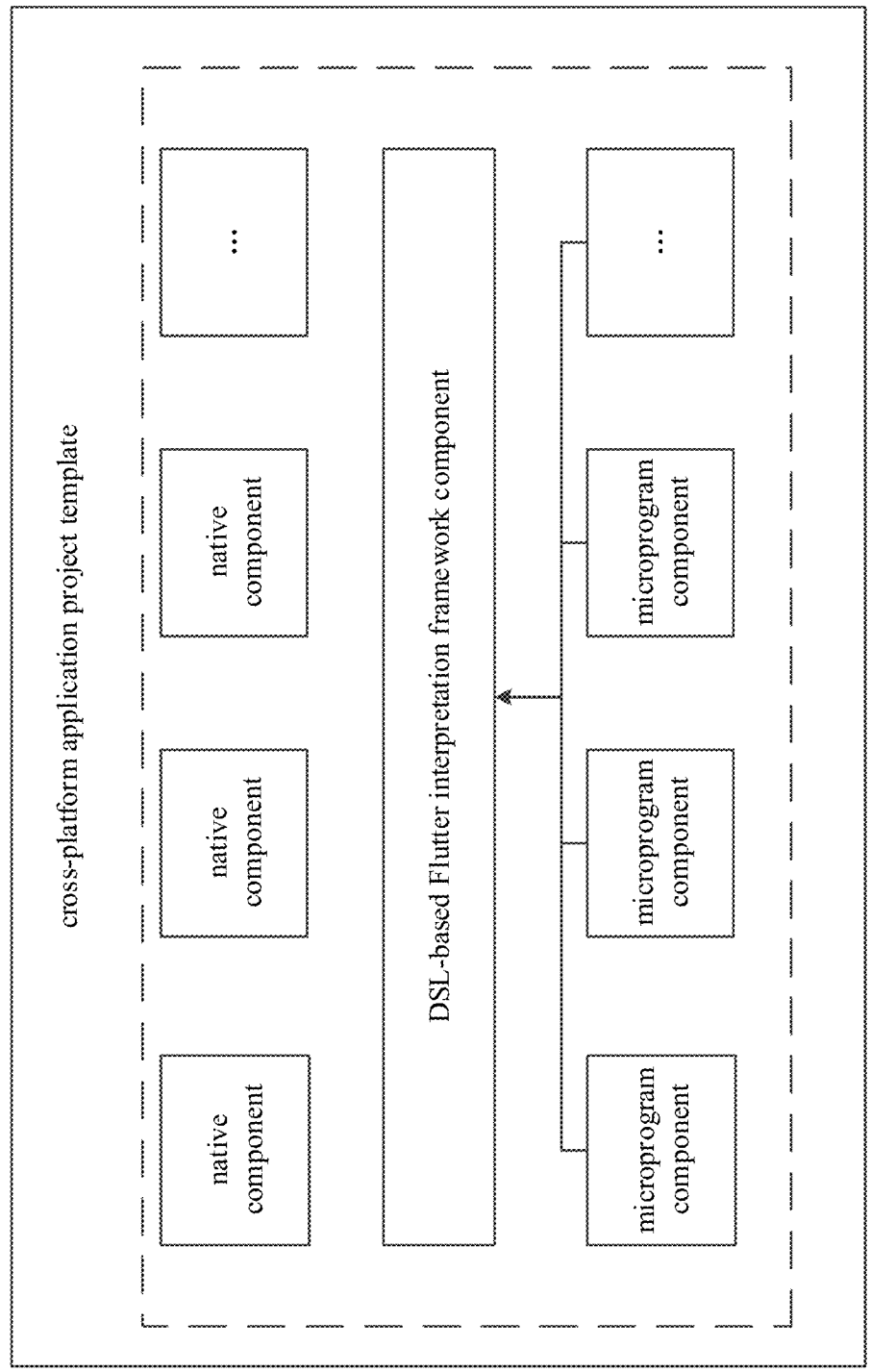
FIG. 4 shows an internal structure diagram of a project template of a cross-platform application according to an embodiment of the present disclosure.

The component source code hosting platform is used to manage and store source codes of microprogram components and cross-platform application project templates. FIG. 4 shows an internal structure diagram of a cross-platform application project template according to an embodiment of the present disclosure. As shown in FIG. 4, the platform application project template is loaded with a DSL-based Flutter interpretation framework component and information (including microprogram entrance configuration files) about microprogram components connected with the DSL-based Flutter interpretation framework component. In an example, the cross-platform application project template is also loaded with native components and microprogram components that are connected with the DSL-based Flutter interpretation framework component.

In an optional example, the component source code hosting platform may be, for example, an independent code management platform such as Git or SVN (Subversion), that is, the component source code hosting platform may be used as an independent closed-loop system. In another optional example, it is also possible to perform operations such as downloading a source code of a microprogram component and a cross-platform application project template through an external interface provided by the component source code hosting platform in a remote network connection manner. The functional modules of the component source code hosting platform include a source code management, a user management and a business interface, and the module of the user management may be a self-contained system.

The component package hosting platform is used to manage and store native component dependency packages. In an optional example, the component package hosting platform may be, for example, an independent third-party library such as JAR (Java application resource) or AAR (Android application resource), that is, the component package hosting platform may be used as an independent closed-loop system. In another optional example, operations such as downloading a native component dependency package may be performed through an external interface provided by the component package hosting platform in a remote network connection manner. The functional modules of the component package hosting platform includes a component package management, a user management, and a business interface, and the module of the user management may be a self-contained system.

The cross-platform application automation construction system is used for cross-platform application automation construction and workflow management. The cross-platform application automation construction system may be connected to the component and cross-platform application management backend through a software interface, so as to invoke related processes and business lines of automation construction, and to realize the writing of microprogram component dependency parameters and the related process of creating a cross-platform application. In another example, the cross-platform application automation construction system may be connected to the component and cross-platform application management backend via an external interface provided by the cross-platform application automation construction system in remote network connection manner, and the component and cross-platform application management backend invokes the interface and sends construction parameters inputted by the user to the cross-platform application automation construction system, so as to realize the complete cross-platform application automation construction process. The cross-platform application automation construction system includes: Jenkins automation construction, cross-platform application scripts, iOS business scripts, Android business scripts and other parts. In an optional example, the cross-platform application automation construction system can be used as an independent closed-loop system.

In an optional example, the component source code hosting platform and the component package hosting platform may be combined into a database platform for managing and storing source codes of microprogram components, project templates, and native component dependency packages. It is appreciated that the combined platform may also be used as an independent closed-loop system, and it is able to perform operations such as downloading a source code of a microprogram component, a project template, and a native component dependency package through an external interface provided by the combined platform in a remote network connection manner.

In another optional example, the component and cross-platform application management backend, the component source code hosting platform, and the component package hosting platform may be combined into one database platform for managing and storing information and details of microprogram components, native components and cross-platform application project templates, source codes of the microprogram components, the project templates, and native component dependency packages.

The software structure of the embodiments connects or links multiple nodes of automated construction and component management business process together, thereby forming a complete set of cross-platform application automated construction business system.

Figure 5:
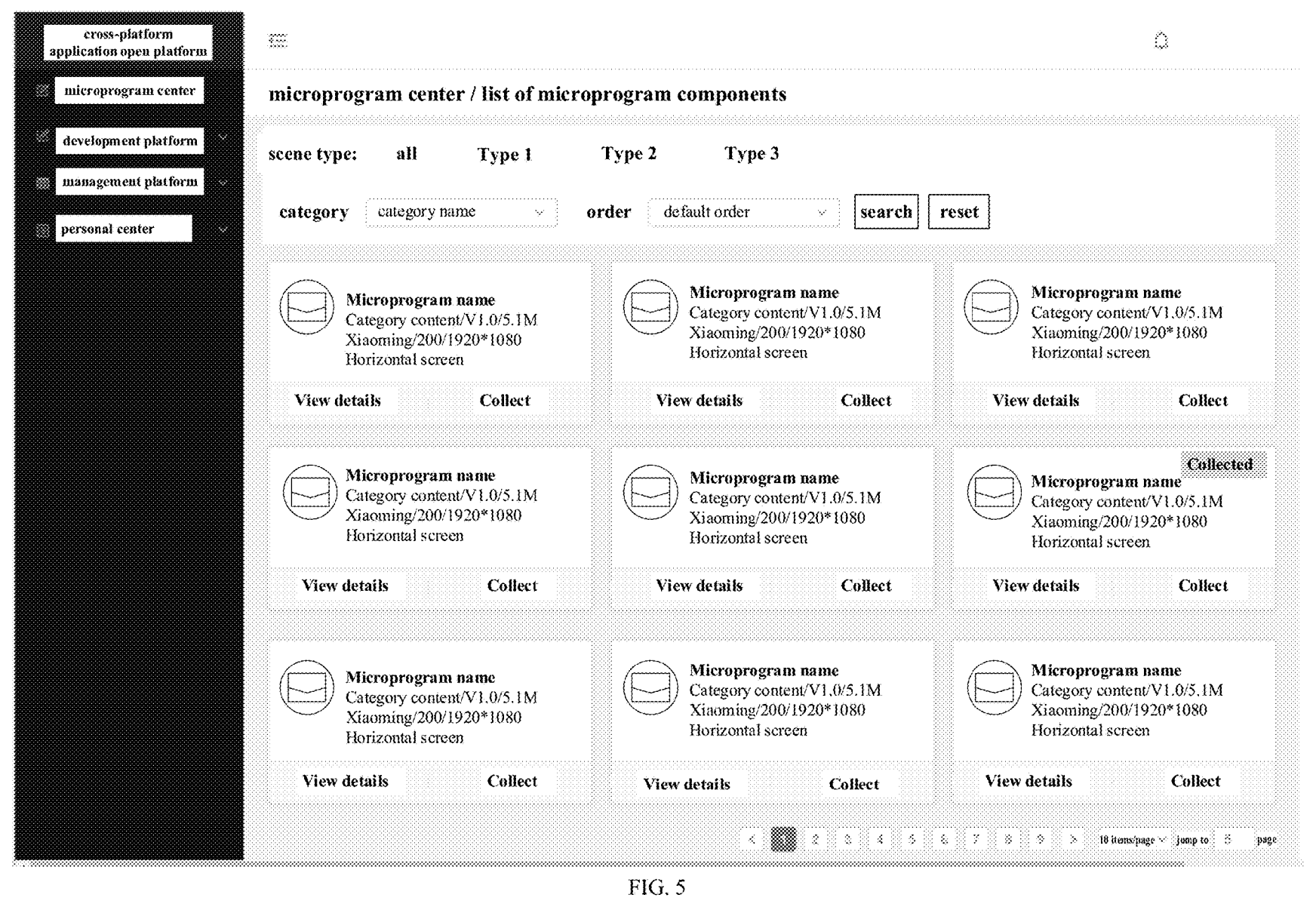

In an optional example, before selecting a cross-platform application project template and information of a microprogram component corresponding to the cross-platform application project template, a developer may open the cross-platform application open platform displayed on the developer's terminal device, and inquire detailed information of the microprogram component on a microprogram center in a Web interface as shown in FIG. 5. Thus, developers can understand the detailed information of the microprogram component and avoid repeated development of components, it is easy for component query, and the component reuse rate is improved.

In an optional embodiment, the microprogram component is a component in a format of an abstract syntax tree. The abstract syntax tree (AST) is a kind of tree representation of an abstract syntactic structure of source code written in a programming language, and each node of the tree denotes a construct occurring in the source code. The abstract syntax tree does not indicate every detail occurring in the real syntax. For example, nested parentheses are implicit in the tree structure and are not presented in the form of nodes, thereby reducing the workload of parsing and loading microprogram components. The abstract syntax tree format does not depend on the grammar of a source language, that is to say, the context used in the grammatical analysis stage has no grammar, so as to avoid introducing some redundant elements into the grammatical analysis, which will adversely affect the subsequent stages, or even confuse the entire stage. As a cross-platform component based on Flutter technology, the microprogram component in the embodiments is different from other native components. As a component in an abstract syntax tree format, the microprogram component occupies a smaller capacity, and integrates a cross-platform Flutter capability and an AST analysis capability into a cross-platform project template based on the componentization technique of a mobile application. The microprogram component dynamically parses and generates pages by dynamically issuing microprogram component entrance files, simplifying the process for parsing the Flutter component and loading the microprogram component, improving the parsing and loading speed, which can realize the millisecond-level parsing/loading speed of the microprogram component, thereby improving the user experience.

In an optional example, an execution subject (such as the server 105) that executes the cross-platform application construction method receives construction parameters inputted by a developer or a user through a construction application management part of the cross-platform application open platform. The construction parameters include a cross-platform application project template, information about a microprogram component corresponding to the cross-platform application project template, and application information operation process inputted by the developer or the user. The cross-platform application open platform transmits the above-mentioned construction parameters inputted by the developer or the user to the component and cross-platform application management backend for screening or filtering the application parameters, so as to determine whether the construction parameters are correct, and ensure the normal construction of the cross-platform application. If an error is found in the construction parameters after screening, the cross-platform application open platform may display a wrong location to the developer or the user, for example, displaying information such as "input error", "information error", and may prompt the developer or the user to make a new selection.

In an optional implementation, the obtaining the project template of the cross-platform application includes: invoking a cross-platform application script; and searching for the project template of the cross-platform application.

In an embodiment, after the execution subject (such as the server 105) that executes the cross-platform application construction method have received the construction parameters inputted by the developer, and the component and cross-platform application management backend has screened the application parameters, the component and cross-platform application management backend invokes the cross-platform application script by invoking an automated construction interface in the cross-platform application automation construction system. The cross-platform application script inquires or searches for the cross-platform application project template and the microprogram component by connecting to the component source code hosting platform, and download the cross-platform application project template and information about the microprogram component (for example, including an entrance configuration file of the microprogram component), which are selected by the developer. In an optional example, the component and cross-platform application management backend may also call a cross-platform application script by invoking the automated construction interface in the cross-platform application automation construction system, and the cross-platform application script inquires or searches for a native component through the component package hosting platform, and download the native component selected by the developer. It may be understood that the downloading the cross-platform application project template and the information about the microprogram component may include: downloading the cross-platform application project template and the information about the microprogram component from a second platform different from the first platform, where the cross-platform application project template initially belongs to or originated from the second platform.

In an optional implementation manner, the obtaining the project template of the cross-platform application includes: invoking a cross-platform application script; and searching for the project template of the cross-platform application from a second platform, where the second platform is different from the first platform, and the project template of the cross-platform application belongs to the second platform.

In an optional implementation manner, the obtaining the project template of the cross-platform application and information about a microprogram component corresponding to the project template of the cross-platform application, in response to an operation of selecting the project template of the cross-platform application by a user on a first platform includes:

in response to an operation of the user selecting information of the project template of the cross-platform application displayed on an interface of the first platform, obtaining the project template of the cross-platform application; and in response to an operation of the user selecting information of the microprogram component displayed on an interface of the first platform, obtaining the information of the microprogram component corresponding to the project template of the cross-platform application.

In an optional implementation manner, the in response to an operation of the user selecting the project template of the cross-platform application displayed on an interface of the first platform, obtaining the project template of the cross-platform application includes: in response to the operation of the user selecting information of the project template of the cross-platform application displayed on the interface of the first platform, selecting the project template of the cross-platform application from a second platform, where the second platform is different from the first platform, and the project template of the cross-platform application belongs to the second platform.

In an optional implementation manner, the in response to an operation of the user selecting information of the microprogram component displayed on an interface of the first platform, obtaining the information of the microprogram component corresponding to the project template of the cross-platform application includes: in response to the operation of the user selecting information of the microprogram component displayed on the interface of the first platform, obtaining the information of the microprogram component corresponding to the project template of the cross-platform application from a second platform, where the second platform is different from the first platform, and the project template of the cross-platform application belongs to the second platform.

Specifically, the cross-platform application open platform in the execution subject (for example, the server 105) that executes the cross-platform application construction scheme may display a Web page on a terminal device of the developer, as shown in FIG. 5 to FIG. 12, and the Web page incudes information about the cross-platform application project template and information about the microprogram component corresponding to the cross-platform application project template.

The page displayed by the cross-platform application open platform includes a microprogram center, a development platform, a management platform, and a personal center. A prototype of the microprogram center is shown in FIG. 5. The microprogram center includes a display list of all microprogram components stored in the server, and each of the microprogram components may be arranged in a card layout or in other well-known layout methods. The displayed content about each microprogram component includes, but not limited to: a name of the microprogram component, a type of the microprogram component, a category of the microprogram component, a version of the microprogram component, a developer of the microprogram component, the number of citations of the microprogram component, whether the microprogram component supports the use in horizontal or vertical screen, a default resolution supported by the microprogram component, and a brief description of the microprogram component. In an optional example, there are two virtual buttons "view details" and "collect" under each microprogram component, so that developers can collect a corresponding microprogram component on a current page to favorites according to their actual needs, or perform other follow-up operations such as inquiring details, filtering a microprogram component, or searching for a microprogram component.

Figure 6:
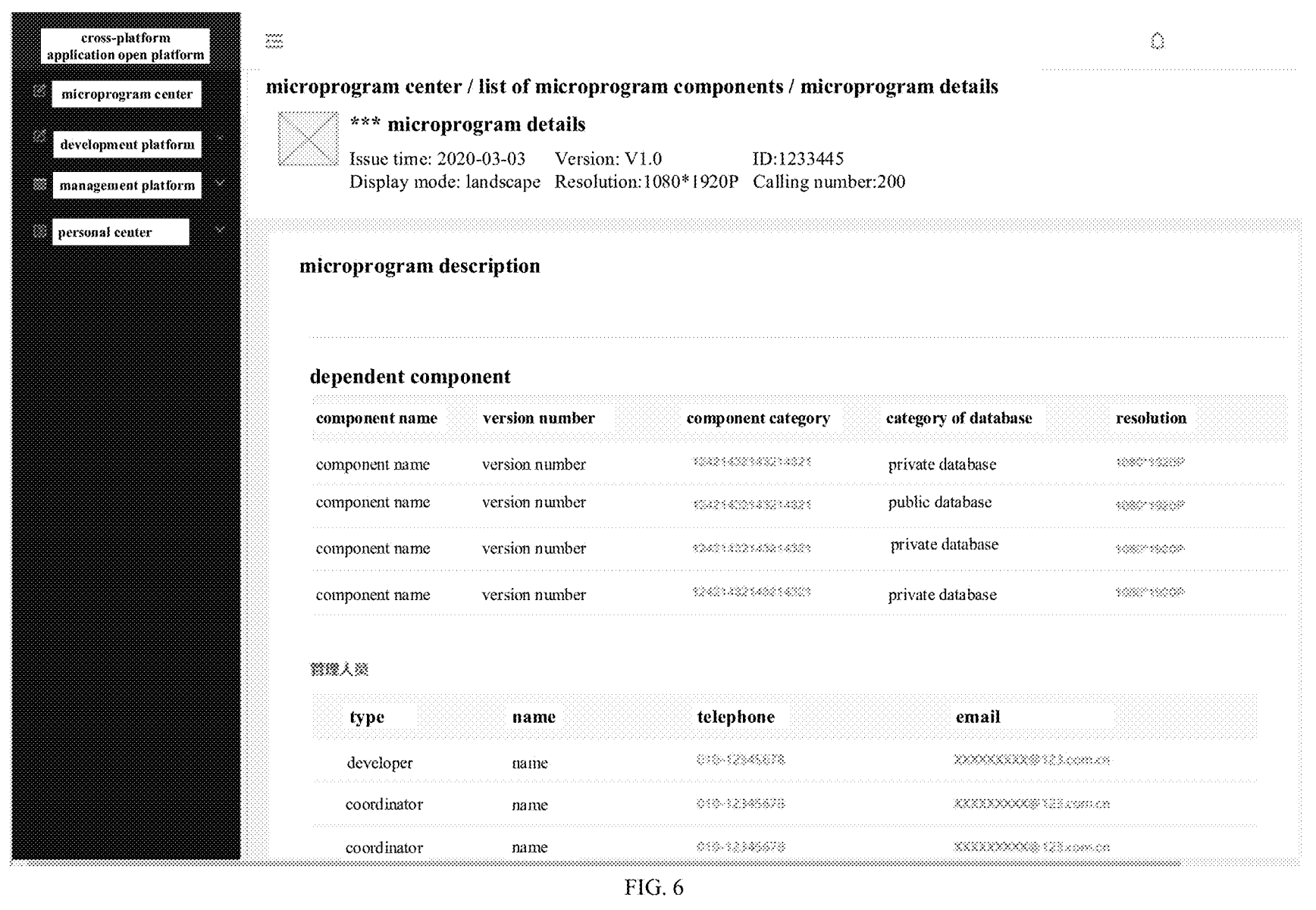

When a developer clicks the "view details" virtual button of any microprogram component on a microprogram component list of a display page of the microprogram center, a query page for microprogram component details will be jumped, as shown in FIG. 6. This page is used to display the details of the selected microprogram component, and the displayed content includes but not limited to: a name of the microprogram component, the release time, a collection status of the developer, a type of the microprogram component, a category of the microprogram component, a serial number of the microprogram component, a person in charge of the microprogram component, the number of citations of the microprogram component, whether the microprogram component supports the use in horizontal or vertical screen, a screenshot of the microprogram component, a default resolution supported by the microprogram component, a brief description of the microprogram component, a version number of the microprogram component, an internal dependency condition of the microprogram component, and a list of coordinators of the microprogram component.

In addition, the application management module of the development platform on a page of the cross-platform application open platform is mainly configured to display a list of all cross-platform applications released by developers and managed coordinators, and may also be configured to implement functions about the related process entrance of creating a cross-platform application. The displayed content on a page of the application management module includes, but is not limited to: a name of a cross-platform application, the release time of the cross-platform application, a version of the cross-platform application, a category of the cross-platform application, a platform supported by the cross-platform application, an application status of the cross-platform application, a list of operating functions of the cross-platform application. The application status of the cross-platform application may include but is not limited to: listed, unaccomplished, or pending update.

Figure 7:
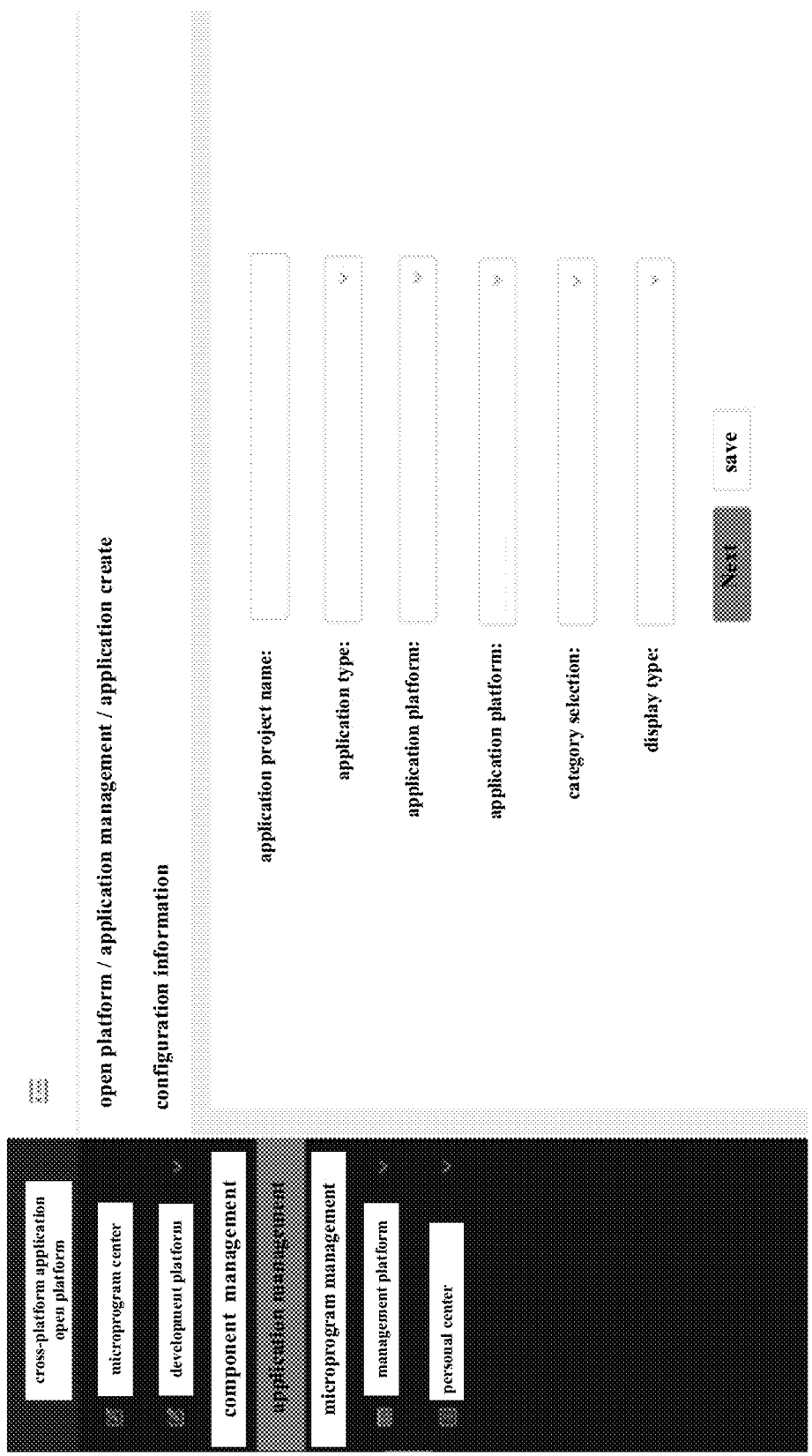
FIG. 7 shows a prototype diagram of a page for creating a cross-platform application in an application management module according to an embodiment of the present disclosure.

In an optional example, the developer may perform operations about creating a cross-platform application by clicking the virtual button "create application" on the page of the application management module, and the page for creating a cross-platform application is shown in FIG. 7. The page of for creating the cross-platform application requires the developer to enter basic information of the cross-platform application. The basic information includes but is not limited to: a name of the cross-platform application project to be constructed, a type of the cross-platform application, a platform supported by the cross-platform application, and a category of the cross-platform application to be selected (such as a cross-platform application), a resolution and a display type, etc. After the developer has entered or written the above basic information, the developer may click a virtual button of "Next" on the creation page to store the basic information entered by the developer and enter the second step of creating the cross-platform application, which is to select a project template of the cross-platform application.

Figure 8:
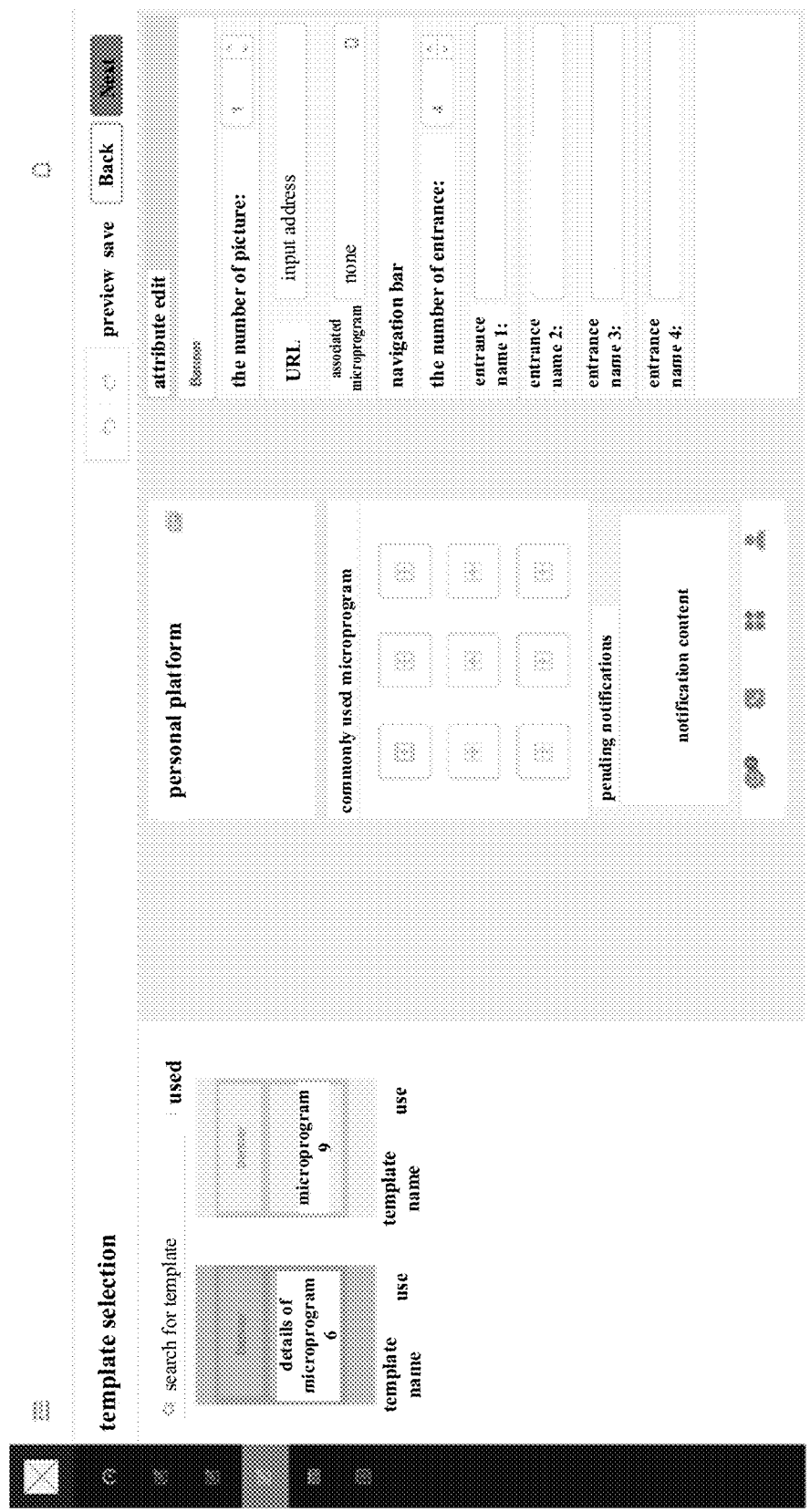
FIG. 8 shows a prototype diagram of a page for selecting a cross-platform application project template in an application management module according to an embodiment of the present disclosure.

FIG. 8 shows a page for selecting a cross-platform application project template in the application management module. A main function of this page is to select a project template of the cross-platform application in the corresponding field. The page may also provide developers with functions such as page view of the cross-platform application project template, element query, and retrieval for a cross-platform application project template based on a name. The cross-platform application project template is mainly a cross-platform interpretation framework component that carries a specific implementation mode of page UI, a UI support mode, and a page content mode. For example, the cross-platform application project template includes a cross-platform application project template of a DSL-based Flutter interpretation framework component. In an optional example, the operation of the developer on the interface displaying the information of the cross-platform application project template may include, for example, clicking a "use" virtual button under the cross-platform application project template in the page for selecting the cross-platform application project template, so as to select the cross-platform application project template.

Figure 9:
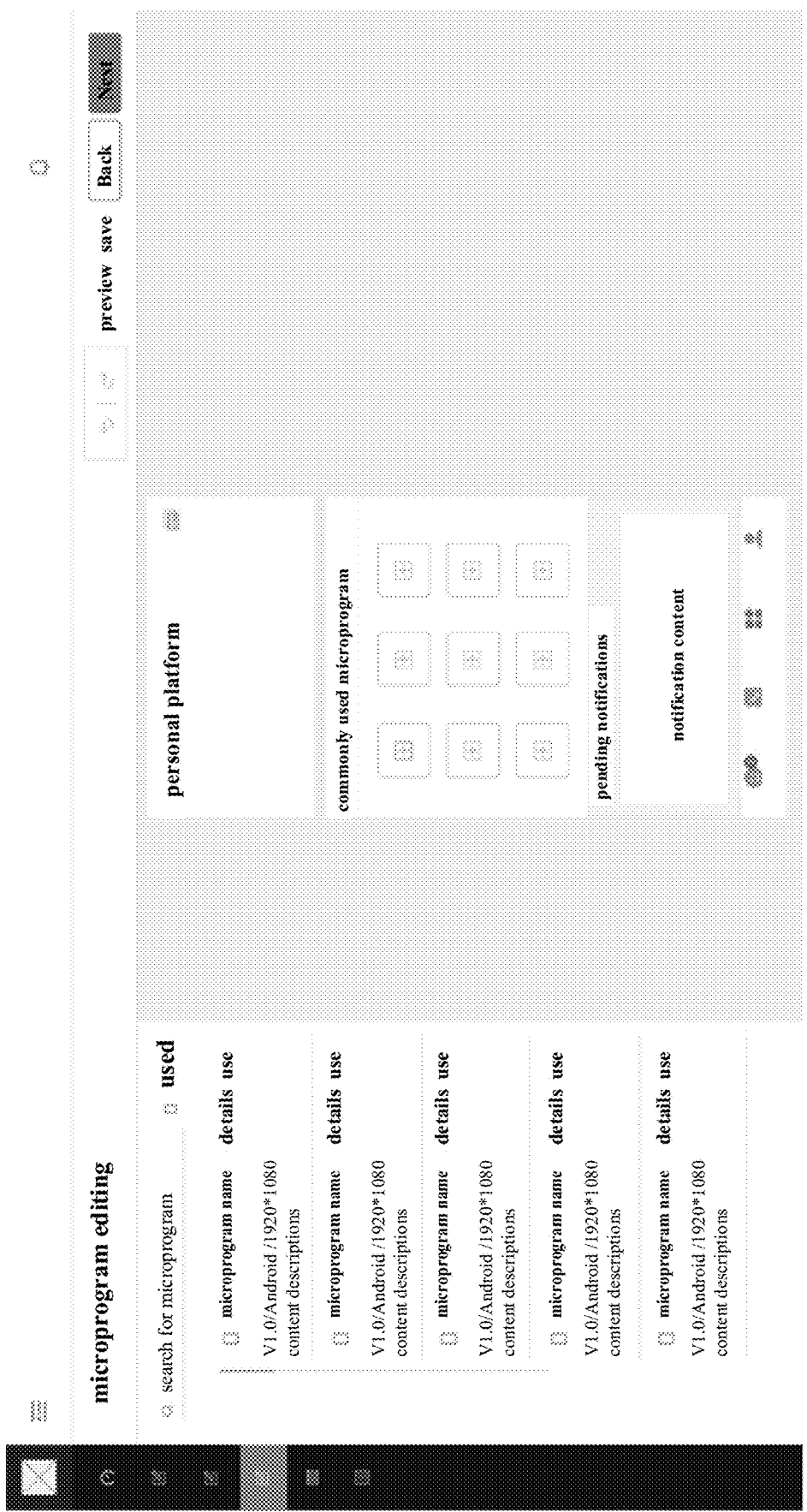
FIG. 9 shows a prototype diagram of a microprogram component selection page in an application management module according to an embodiment of the present disclosure.

When the developer selects the required cross-platform application project template and clicks the "Next" virtual button on the page, a microprogram component selection page is entered, as shown in FIG. 9. The microprogram component selection page is used to display a list of all the stored microprogram components, and the displayed content may be classified, for example, by types of microprogram components. In an optional example, an operation of the developer on the interface displaying the information of the microprogram component corresponding to the selected cross-platform application project template may include, for example, clicking a virtual button "use" of the microprogram component, and adding information of the selected microprogram component to a corresponding position of the microprogram component control area of the cross-platform application project template, according to an usage order of the microprogram components. The developer may also click a virtual button "details" of the microprogram component, and jump to a details query page of the microprogram component. After the developer has selected the information about the microprogram component, he may click the "Next" button on the microprogram component selection page, and enter a page for editing and selecting a native component.

Figure 10:
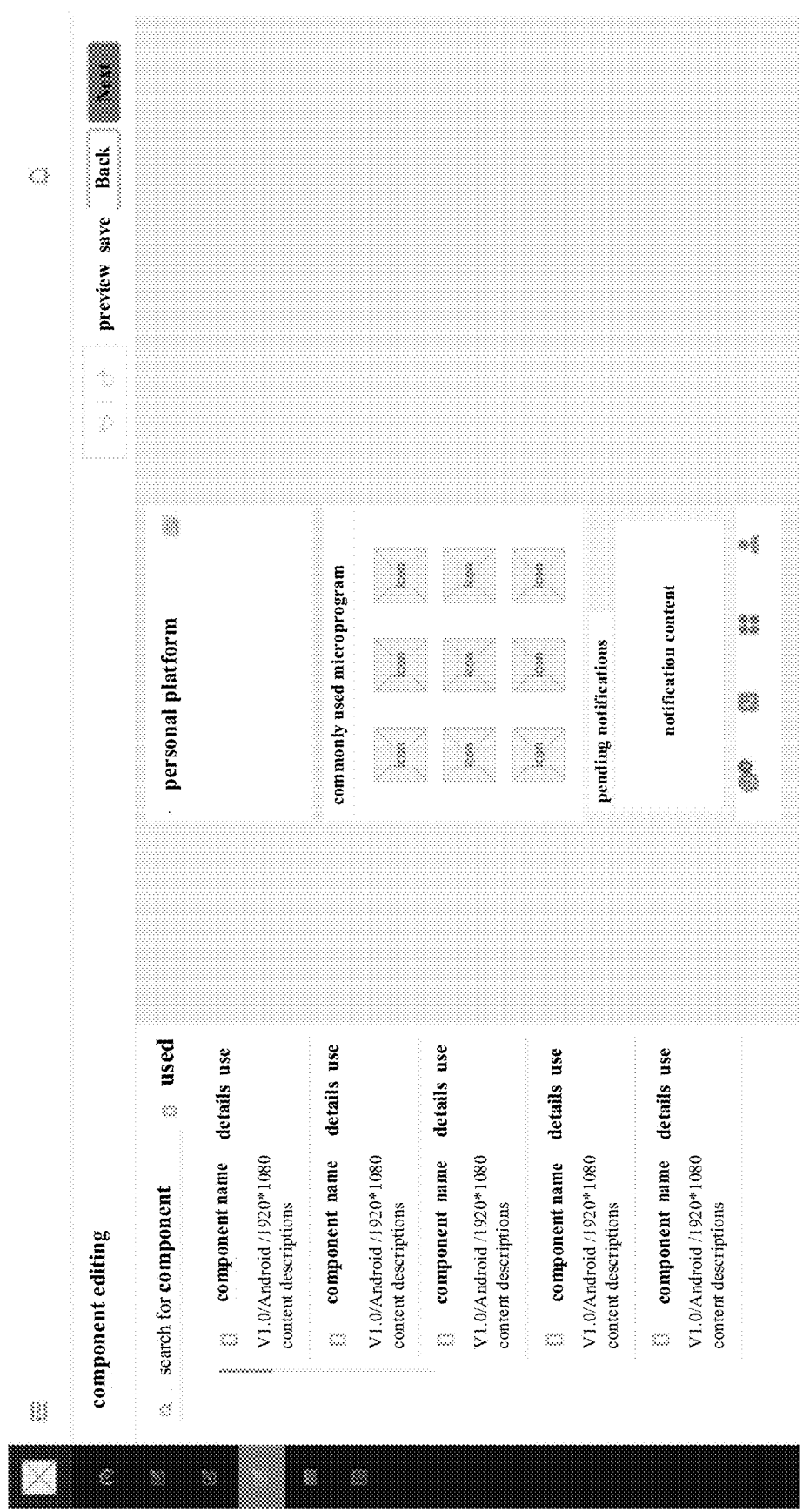
FIG. 10 shows a prototype diagram of page for editing and selecting a native component in an application management module according to an embodiment of the present disclosure.

The page for editing and selecting a native component is shown in FIG. 10. This page is used to display a list of all stored native components. For example, the displayed content may be classified based on types of components. A developer clicks a virtual button "use" of the native component, and adds the selected native component to the cross-platform application project template according to the usage order of components, which is an operation of the developer on the interface that displays the information of the native components. This page is mainly used to empower a native component capability into a cross-platform application to realize an underlying interaction capability of the cross-platform application. After completing the selection of the native component, the developer may click the virtual button "Next" to enter an application information editing page.

Figure 11:
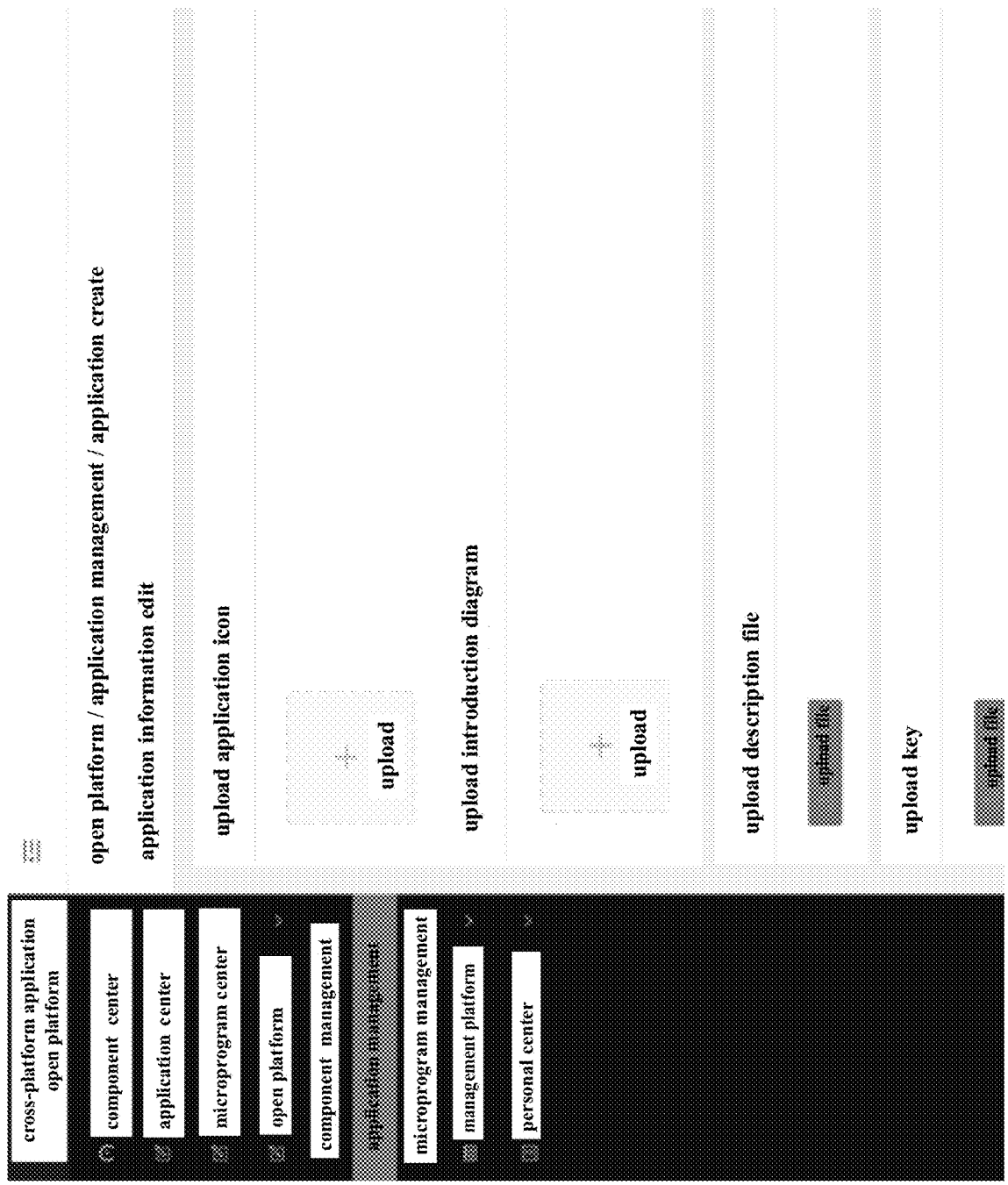
FIG. 11 shows a prototype diagram of an application information editing page in an application management module according to an embodiment of the present disclosure.

The application information editing page is shown in FIG. 11, which is mainly used to upload an icon of cross-platform application, upload an introduction diagram of the cross-platform application, and upload a description file of the cross-platform application. In an optional example, the application information editing page may also be used for operations, such as uploading an application certificate dedicated to an IOS platform, and adding information about a management member. After the upload is completed, the developer may click the virtual button "Next" to enter an application construction completing page.

Figure 12:
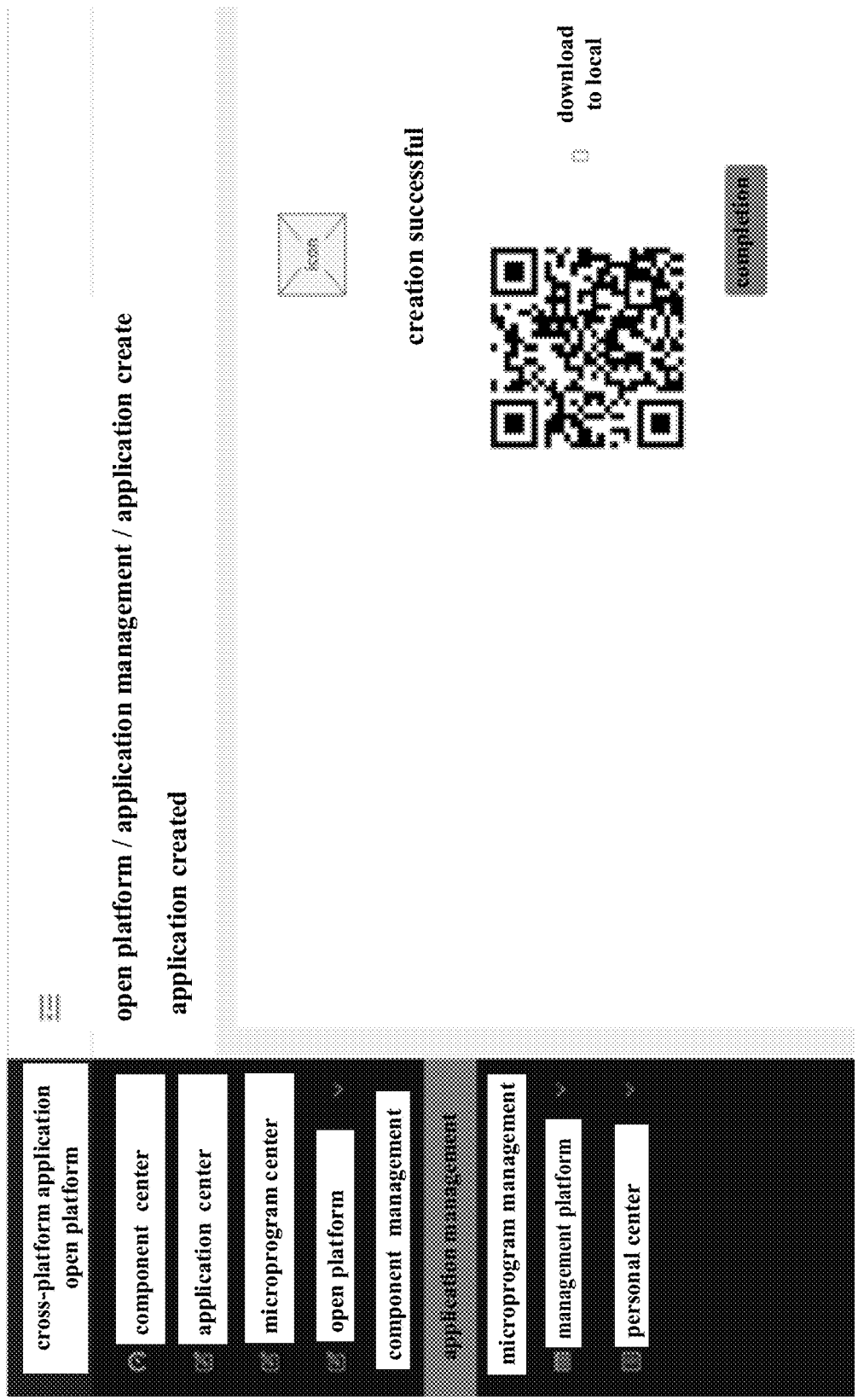
FIG. 12 shows a prototype diagram of an application construction completing page in an application management module according to an embodiment of the present disclosure.

The application construction completing page is shown in FIG. 12, which is mainly used to show a cross-platform application constructing result to the developer for confirmation. If the developer confirms that the cross-platform application has been successfully built or constructed, a two-dimensional (QR) code or a "download to local" button of the cross-platform application may be displayed on this page, and the developer or user may directly download a cross-platform application package to a terminal device by scanning the two-dimensional code, or may download the cross-platform application package to a local device by clicking the "download to local" button.

In the embodiments, in response to the user's operation on the interface, the cross-platform application project template and the information of the microprogram component are obtained. In other words, parameter configuration (including project template selection and microprogram component information selection) before the cross-platform application is automatically constructed by means of visualization and pages, and a unified process guidance method enables the developer to quickly find and select a project template, and combine information of multiple microprogram components to generate a cross-platform application package, which reduces the overall learning cost, and improves the convenience of interaction and process for developers in cross-platform application automatic construction scenarios. Thus, it can significantly solve the problems of repeated development of components, difficult to inquire a component, and a low component reuse rate, which often occur by the developers in the process of componentization, modularization and cross-platform capability design of the cross-platform application.

Step S202 includes: constructing an application on the first platform and generating an application package, based on the project template of the cross-platform application and the information about the microprogram component.

Figure 13:
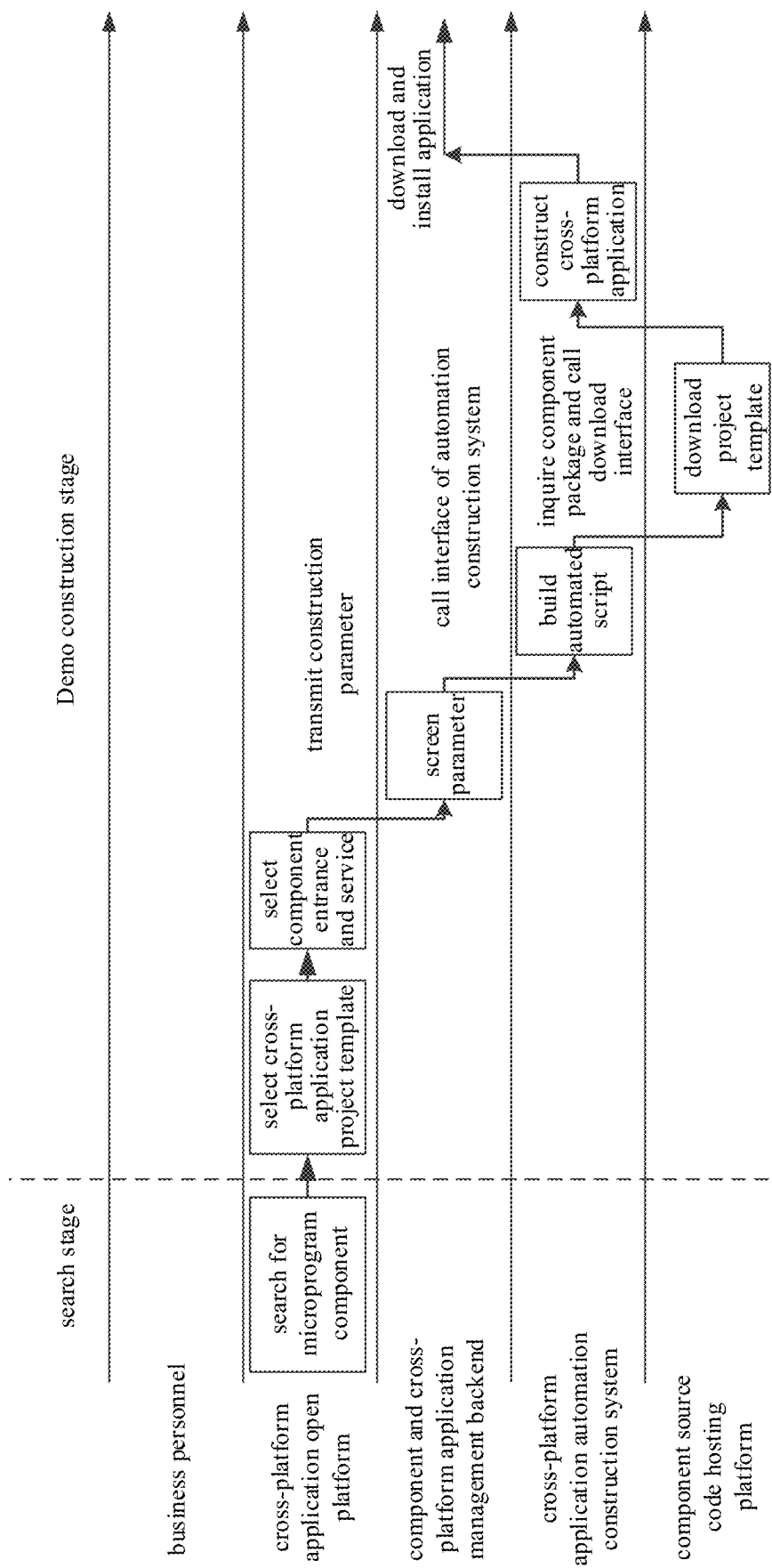
FIG. 13 shows a business principle diagram of a process of constructing a cross-platform application according to an embodiment of the present disclosure.

In an optional example, after the execution subject (for example, the server 105) that executes the cross-platform application construction solution obtains the cross-platform application project template selected by the developer and the information about the microprogram component corresponding to the selected cross-platform application project template, the cross-platform application selected by the developer is built or constructed through a cross-platform application construction process. For example, the obtained cross-platform application project template and the information about the corresponding microprogram component are packaged to generate an executable or installable application, by Jenkins automated construction of the cross-platform application automation construction system, then the application is issued, and the generated application package is stored in the component and cross-platform application management backend, which is provided for users or developers to download and use, as shown in FIG. 13.

In an optional implementation manner, the method further includes: obtaining a native component corresponding to the project template of the cross-platform application. The constructing an application on the first platform based on the project template of the cross-platform application and the information about the microprogram component includes: constructing the application on the first platform based on the project template of the cross-platform application, the information about the microprogram component, and the native component.

In an optional implementation manner, the obtaining the native component corresponding to the project template of the cross-platform application includes: searching and obtaining the native component from a second platform, where the second platform is different from the first platform, and the project template of the cross-platform application belongs to the second platform.

In an optional implementation manner, the obtaining the native component corresponding to the project template of the cross-platform application includes: displaying a list of pre-stored native components on the first platform; and obtaining the native component, in response to an operation of the user selecting the native component from the list of native components.

Specifically, the execution subject (for example, the server 105) that executes the cross-platform application construction method obtains the native components selected by the developer from other platforms, in response to an operation on an interface displaying the selected native component, and the server constructs the cross-platform application based on the project template of the cross-platform application, the information about the microprogram component, and the native component. In such a manner, the microprogram component and the original native component can be compatible for execution under the Flutter framework, so that developers can build or construct the cross-platform application more flexibly, thereby further reducing the development redundancy and the development workload, and promoting the work process for cross-platform development.

When constructing a cross-platform application running on an Android (Android) system based on Flutter, a construction path and a construction parameter configuration method adopted by the cross-platform application construction method provided in an embodiment are described as follows.

In an optional implementation manner, for a cross-platform application running on an Android system, the obtaining a project template of the cross-platform application and information about a microprogram component corresponding to the project template of the cross-platform application; and constructing an application on the first platform and generating an application package, based on the project template of the cross-platform application and the information about the microprogram component includes:

obtaining and modifying a project template file of the project template of the cross-platform application, and writing a native component dependency parameter;

writing a name of the cross-platform application, obtaining a file of a home interface of the cross-platform application, and modifying a name of the file of the home interface;

extracting and downloading a Flutter component dependency, and writing a microprogram component dependency parameter; and constructing the application and generating the application package.

In an optional example, different from the construction process of the Android native application in related technologies, a construction process of a cross-platform application running on an Android system provided by this implementation is as follows.

First of all, for construction parameters, the parameters that need to be modified include but are not limited to: whether it is a test package (debug/release), native component dependency, microprogram component dependency, a name of the cross-platform application, a name of the process, a version of the cross-platform application (version number and version name), an internal ID of the cross-platform application (as a unique ID for dynamic page configuration), an opening page of the cross-platform application, and an address for downloading an icon of the cross-platform application.

The steps required to build and release the cross-platform application are similar to steps for building and releasing a general application in the related technologies, which include but not limited to: downloading a project template file, receiving and constructing a dependent parameter, modifying a parameter of an internal file of the cross-platform project application, executing cross-platform application construction, and uploading the parameters to the component and cross-platform application management backend. However, the corresponding construction parameters and the internal file modification position in the embodiments are different from the application construction method in the related technologies.

Specifically, after the icon of the cross-platform application has been downloaded, a storage path is set to: /android/app/src/main/res/ plus an icon corresponding path, for example:

ic_launcher_hdpi.png—/src/main/res/mipmap-hdpi;
ic_launcher_mdpi.png—/src/main/res/mipmap-mdpi;
ic_launcher_xdpi.png—/src/main/res/mipmap-xhdpi;
ic_launcher_xxdpi.png—/src/main/res/mipmap-xxhdpi;
ic_launcher_xxxdpi.png—/src/main/res/mipmap-xxxhdpi.

In an embodiment, an execution subject (for example, the server 105) that executes the cross-platform application construction solution obtains the project template file, modifies the project template file, injects a native component dependency parameter, and modifies a file named "android/app/build.gradle", and injects relevant information, such as native component dependency of the project template file, a version of cross-platform application (including a version number and a version name), a process name, and whether it is a test package (debug/release).

The name of the cross-platform application is injected or written by modifying the content in a page named "/android/app/src/main/res/values/strings.xml", and a picture of the opening page is downloaded and put into a folder named "/android/app/src/main/res/drawable/", and is modified to a specific name.

In addition, the execution subject (for example, the server 105) that executes the cross-platform application construction solution executes a Flutter pub get command in a root directory of a workspace, and extracts and download Flutter component dependencies. At the same time, the dependency parameter of the microprogram component is injected or written by modifying a file named "./pubspec.yaml". Subsequently, a cross-platform application package is built or constructed through a tool named "gradlew" under the Android folder.

For compiling a test package and an official package, whether the parameters are for the test package (debug/release) is determined to perform different build commands.

A general construction command for compiling the debug package is: "./gradlew assembleDebug".

A general construction command for compiling the release package is: "./gradlew assembleRelease".

Generally, a construction command for simultaneously compiling the debug and release packages is: "./gradlew assemble".

In steps S201 and S202 according to the embodiments, an application package is generated based on an engineering template of the cross-platform application including a DSL-based Flutter component, information of the microprogram component, and the native component, and a cross-platform Flutter capability is integrated into the engineering template of the cross-platform application. In other words, the cross-platform Flutter capability is packaged into the application package across multiple mobile platforms, and a page can be dynamically analyzed and loaded through the analysis of the microprogram component, so that the built cross-platform application can realize the page dynamic loading capacity under the Flutter framework. Meanwhile, this construction method enables developers to quickly combine or integrate information about microprogram components, accurately a build cross-platform application, and improve the construction efficiency. In addition, developers only need to develop a set of code to integrate or converge multiple mobile platforms to reuse cross-platform functions, which effectively saves the actual research and development investment, avoids the development redundancy, simplifies the componentization and modularization operations, and accelerates the work process of application development.

Step S203 includes: downloading and installing the application package to generate the application, in response to an operation on the application package from the user.

Step S204 includes: running the application, and loading an application interface of the application.

Step S205 includes: in response to an operation on a microprogram control unit displayed on the application interface from the user, downloading, by the Flutter component, the microprogram component based on the information about the microprogram component, parsing the microprogram component and loading an interface of the microprogram component.

Figure 14:
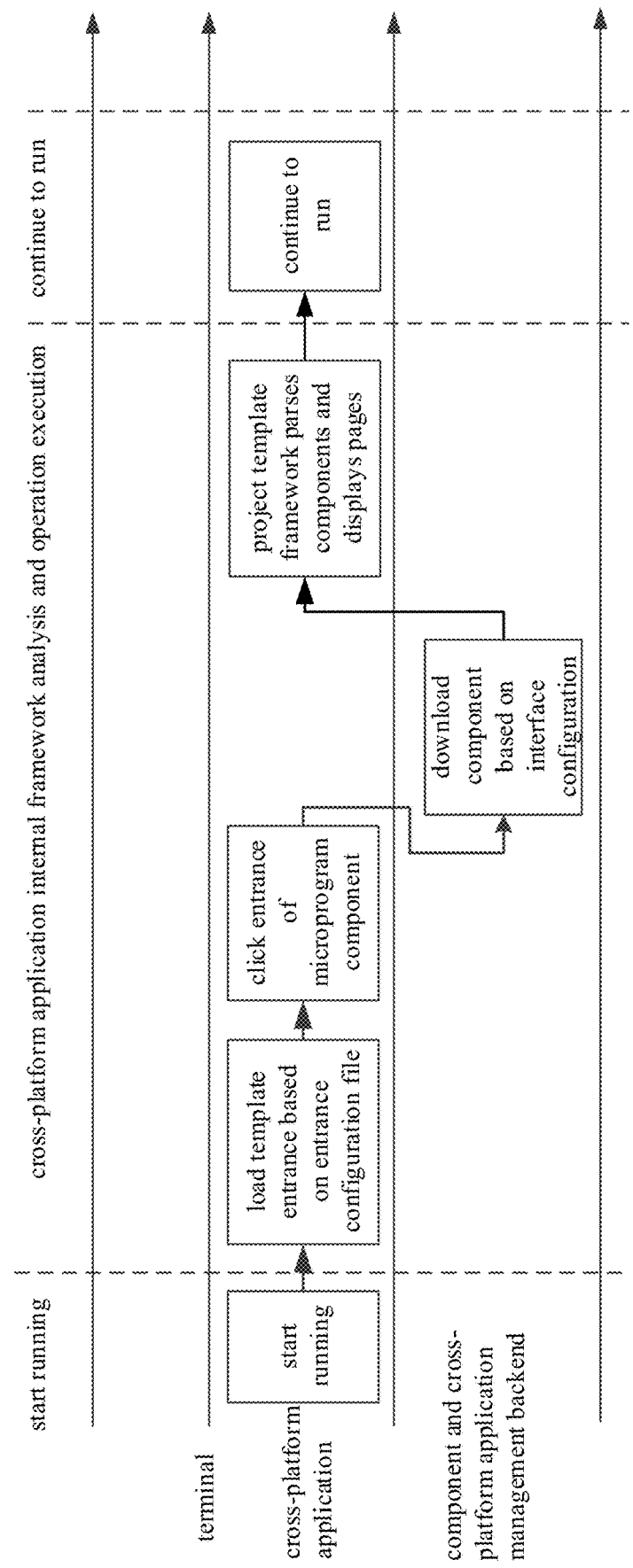
FIG. 14 shows a business principle diagram of an operation process according to an embodiment of the present disclosure.

Specifically, FIG. 14 is a schematic diagram of a service operation process, which illustrates the operation process principle of a DSL-based Flutter interpretation framework component during the process of running a cross-platform application, and the execution subject (for example, the terminal 101, 102, or 103) installs and runs the cross-platform application. In an optional example, a microprogram control unit displayed on an application interface may be a virtual button of the microprogram component set on the display interface of the cross-platform application. An operation on the microprogram control unit displayed on the application interface may include, for example, a developer or a user clicking a virtual button of the microprogram component on the display interface of the cross-platform application. The executive subject (for example, the terminal 101, 102, or 103) that executes the cross-platform application running method responds to the operation of the developer or the user clicking the virtual button of the microprogram component, is connected to the component and the cross-platform application management backend, and downloads a microprogram component from this backend according to an download address of the microprogram component carried in the information about the microprogram component (such as an entrance configuration file) loaded in the cross-platform application project template. The executive subject further parses the downloaded microprogram component file through the DSL-based Flutter interpretation framework component, and displays page content of the microprogram component. It is appreciated that when the microprogram component in this embodiment is updated, only a version of the microprogram component stored in the server (such as the component and the cross-platform application management backend) needs to be updated, and then every time when a user clicks the virtual button of the microprogram component, the latest version of the microprogram component is parsed and loaded, according to a download address of the microprogram component included in the information (such as the entrance configuration file) about the microprogram component loaded in the cross-platform application project template, without the need to repeatedly update the microprogram component in the terminal.

It can be understood that the developer or the user in the embodiments of the present disclosure may be those of ordinary skill in the art or ordinary users.

In steps S203 to S205, a microprogram component is downloaded, analyzed and loaded in response to the operation on a microprogram control unit, thereby realizing page dynamics and real-time loading capabilities under the Flutter framework, reducing a capacity occupied by the microprogram component in the cross-platform applications, and accordingly reducing the capacity occupied by the cross-platform application. At the same time, the running method can also support real-time updates of a microprogram component, and only the microprogram component in the server need to be updated, without repeated update, thereby improving the download, analysis and loading speed of microprogram components.

In an optional implementation manner, the information about the microprogram component is included in an entrance configuration file, and the method further includes: when running the application on the terminal, parsing, by the Flutter component, the entrance configuration file and loading the home interface of the application.

Specifically, as shown in the schematic diagram of the service operation process of FIG. 14, which illustrates the operation process principle of a DSL-based Flutter interpretation framework component during the process of running a cross-platform application, when the execution subject (for example, the terminal 101, 102, or 103) runs the cross-platform application, the DSL-based Flutter interpretation framework component parses or analyzes the entrance configuration file of the microprogram component added during the construction of the application package, and loads an entrance page of the overall cross-platform application project template and a home page of the cross-platform application.

A system for implementing a cross-platform application is provided according to another embodiment of the present disclosure, which includes a server and a terminal.

Figure 15:
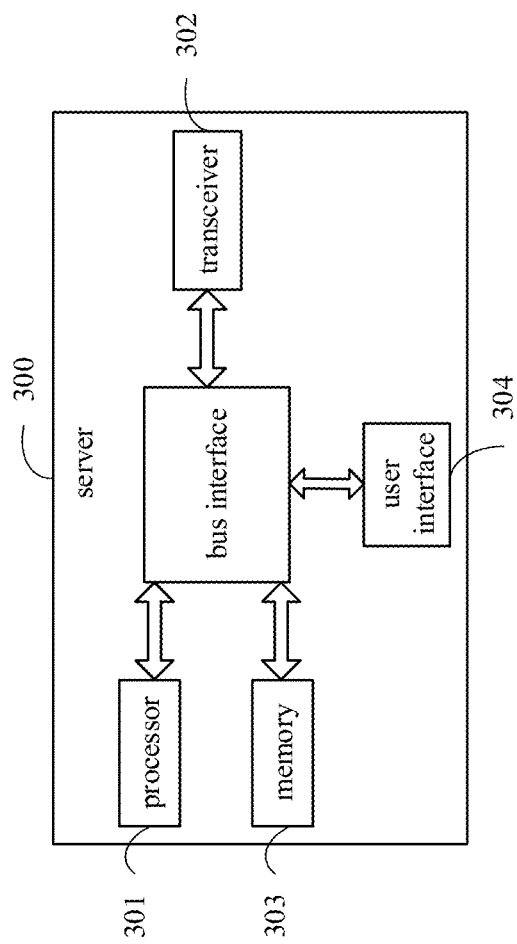
FIG. 15 shows a structural diagram of a server according to an embodiment of the present disclosure.

As shown in FIG. 15, a server 300 includes: a processor 301, a transceiver 302, a memory 303, a user interface 304, and a bus interface. The memory 303 stores a program that is executable on the processor 301. When executing the program, the processor 301 is configured to:

obtaining a project template of the cross-platform application and information about a microprogram component corresponding to the project template of the cross-platform application, in response to an operation of selecting the project template of the cross-platform application by a user on a first platform, where the project template of the cross-platform application includes a Flutter component based on a domain-specific language, and the Flutter component is configured to parse the microprogram component and load an interface of the microprogram component; and constructing an application on the first platform and generating an application package, based on the project template of the cross-platform application and the information about the microprogram component.

In an optional embodiment, the microprogram component is a component in a format of an abstract syntax tree.

Figure 16:
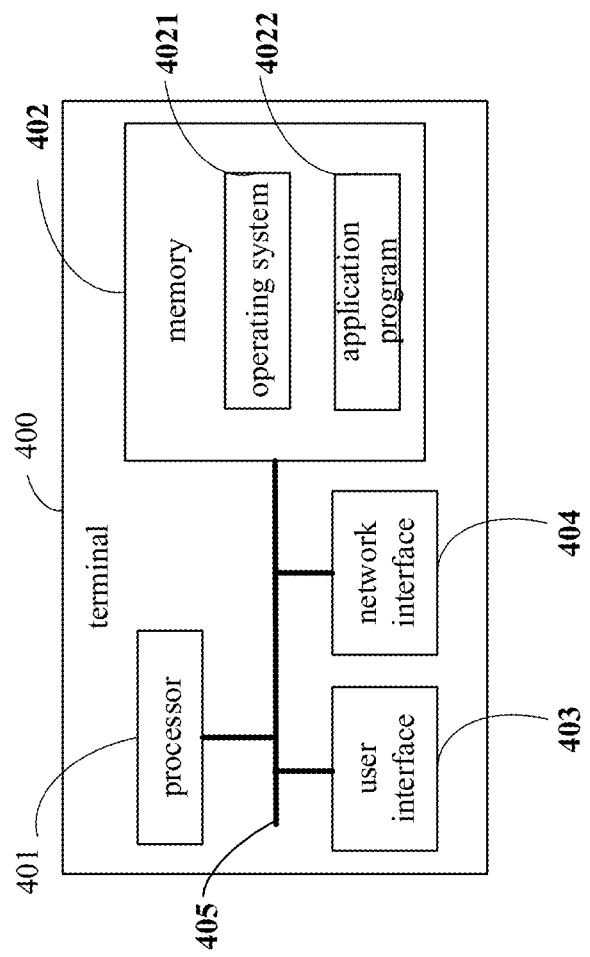
FIG. 16 shows a structural diagram of a terminal according to an embodiment of the present disclosure.

As shown in FIG. 16, a terminal includes: at least one processor 401, a memory 402, at least one network interface 404, and a user interface 403. The various components in the terminal 400 are coupled together through the bus system 405. It can be understood that the bus system 405 is used to implement connections and communications between these components. In addition to the data bus, the bus system 405 includes a power bus, a control bus, and a status signal bus. However, for clarity of description, various buses are marked as the bus system 405 in FIG. 16.

A computer program is stored on the memory 402, and when the program is executed, the processor 401 is configured to:

downloading and installing an application package to generate an application, in response to an operation on the application package from a user, where the application package is constructed based on a project template of the cross-platform application and information about a microprogram component corresponding to the project template of the cross-platform application, and the project template of the cross-platform application includes a Flutter component based on a domain-specific language;

running the application on the terminal, and loading an application interface of the application; and in response to an operation on a microprogram control unit displayed on the application interface from the user, downloading, by the Flutter component, the microprogram component based on the information about the microprogram component, parsing the microprogram component and loading an interface of the microprogram component.

The user interface 403 may include a display, a keyboard, or a pointing device (for example, a mouse, a track ball, a touch panel, or a touch screen, etc.).

In some embodiments, the memory 402 stores the following elements, executable modules or data structures, or their subsets, or their extended sets: an operating system 4021 and an application program 4022.

The operating system 4021 includes various system programs, such as a framework layer, a core library layer, a driver layer, etc., for implementing various basic services and processing hardware-based tasks. The application program 4022 includes various application programs, such as a media player, a browser, etc., which are used to implement various application services. A program for implementing the method of the embodiments of the present disclosure may be included in the application program 4022.

It should be noted that the principle and work flow of the cross-platform application implementing system provided in the embodiments are similar to the above-mentioned cross-platform application implementing method, and the relevant parts can be referred to the above description, which will not be repeated herein.

Figure 17:
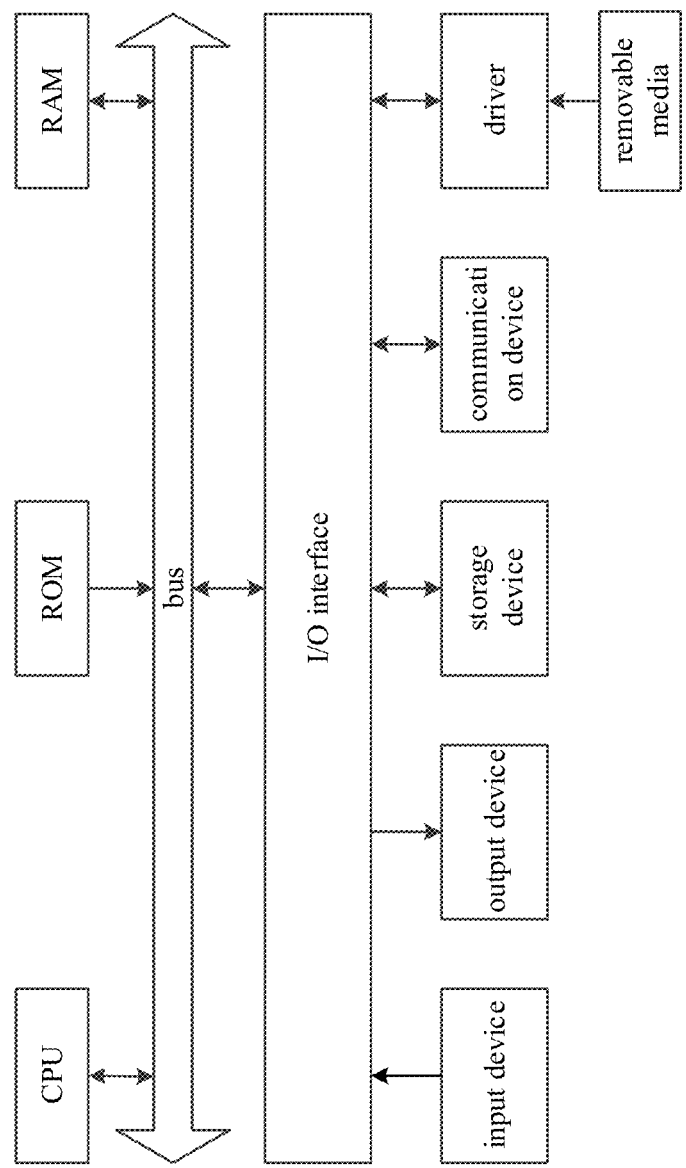
FIG. 17 shows a schematic structural diagram of a computer system that implements the device provided by an embodiment of the present disclosure.

As shown in FIG. 17, a computer system suitable for implementing the cross-platform application implementing system provided by the above embodiments includes a central processing module (CPU), which may perform multiple appropriate actions and processing based on a program stored in a read-only memory (ROM) or a program that is loaded from a storage part to a random access memory (RAM). In RAM, various programs and data required for the operation of the computer system are also stored. CPU, ROM and RAM are connected to each other by a bus. An input/input (I/O) interface is also connected to the bus.

The I/O interface is connected to the following components, which includes: input devices such as a keyboard and a mouse; output devices such as a liquid crystal display (LCD) and a speaker; storage devices such as a hard disk; and communication devices such as a LAN card, a network interface card such as a modem. The communication device performs communication processing via a network such as Internet. The driver is also connected to the I/O interface as needed. The removable media such as magnetic disks, optical disks, magneto-optical disks, semiconductor memories are installed on the driver as needed, so that the computer program can be read from the removable media, and can be installed into the storage device as needed.

In particular, according to an embodiment, the process described in the above flowchart can be implemented as a computer software program. For example, the embodiment includes a computer program product, which includes a computer program stored on a tangible computer-readable medium, and the computer program includes a program code for executing the method shown in the flowchart. In such an embodiment, the computer program may be downloaded and installed over the network through the communication device, and/or installed from a removable medium.

The flowcharts and schematic diagrams in the accompanying drawings illustrate the possible implementation architecture, functions, and operations of the system, method, and computer program product in the embodiments. In this regard, each block in the flowchart or schematic diagram can represent a module, a program segment, or a part of a code, and the above-mentioned module, program segment, or part of the code includes one or more executable instructions for realizing a specified logical function. It should also be noted that, in some optional implementations, the functions recorded in the block may also occur in a different order from the order marked in the drawings. For example, two blocks shown one after the other can actually be executed substantially in parallel, or they can sometimes be executed in a reverse order, depending on the involved functions. It should also be noted that each block in the schematic and/or flowchart, and a combination of blocks in the schematic and/or flowchart can be implemented by a dedicated hardware-based system that performs a specified function or operation, or by a combination of dedicated hardware and computer instructions.

The modules involved in the description of the embodiments can be implemented in software or hardware. The described modules may also be provided in a processor, for example, it may be described as: a processor including an obtaining module and a construction module; or a processor including an installation module and an operation module, where the name of each module do not constitute a limitation on the module itself under a certain condition. For example, the construction module can also be described as "package module".

In another aspect, an embodiment also provides a non-transitory computer storage medium. The non-transitory computer storage medium may be a non-transitory computer storage medium included in the above-mentioned device in the above-mentioned embodiment, or a non-transitory computer storage medium that exists alone and is not assembled into the terminal or the server. The non-transitory computer storage medium stores one or more programs. When the one or more programs are executed by a device, the device is configured to:

obtain a project template of the cross-platform application and information about a microprogram component corresponding to the project template of the cross-platform application, in response to an operation of selecting the project template of the cross-platform application by a user on a first platform, where the project template of the cross-platform application includes a Flutter component based on a domain-specific language;

construct an application on the first platform and generating an application package, based on the project template of the cross-platform application and the information about the microprogram component;

download and install the application package to generate the application, in response to an operation on the application package from the user;

run the application, and load an application interface of the application; and in response to an operation on a microprogram control unit displayed on the application interface from the user, download, by the Flutter component, the microprogram component based on the information about the microprogram component, parse the microprogram component and load an interface of the microprogram component.

It can be understood that the embodiments of the present disclosure may be implemented by hardware, software, firmware, middleware, microcode, or a combination thereof. For hardware implementation, modules, units, sub-modules, sub-units and the like can be implemented in one or more of: application specific integrated circuit (ASIC), digital signal processor (DSP), digital signal processing device (DSP Device, DSPD), programmable logic device (PLD), field-programmable gate array (FPGA), general-purpose processor, controller, microcontroller, microprocessor, other electronic unit that perform the functions described in this application, and a combination thereof.

For software implementation, the technology described herein can be implemented by modules (for example, procedures, functions, etc.) that perform the functions described herein. The software codes can be stored in the memory and executed by the processor. The memory can be implemented in the processor or outside the processor.

Through the description of the above implementation manners, those skilled in the art can clearly understand that the methods in the above-mentioned embodiments can be implemented by means of software plus a necessary general hardware platform, or hardware, but in many cases the former is better. Based on this understanding, the technical solution of this application essentially or the part that contributes to the existing technology can be embodied in the form of a software product, and the computer software product is stored in a storage medium (such as ROM/RAM, magnetic disk, optical disc), and includes several instructions to make a terminal (which may be a mobile phone, a computer, a server, an air conditioner, or a base station, etc.) execute the methods described in the various embodiments of the present application.

The above embodiments are merely used to further describe the objectives, the technical solutions, and the beneficial effects of the embodiments of the present disclosure. It is understandable that the above embodiments are merely optional embodiments of the present disclosure and are not intended to limit the scope of the present disclosure. Any modification, substitutions, or improvements made by a person of ordinary skill in the art without departing from the principle of the present disclosure shall fall within the scope of the present disclosure.

What is claimed is:

1. A method for constructing a cross-platform application, applied to a server, comprising:

obtaining a project template of the cross-platform application and information about a microprogram component corresponding to the project template of the cross-platform application, in response to an operation of selecting the project template of the cross-platform application by a user on a first platform, wherein the project template of the cross-platform application comprises a Flutter component based on a domain-specific language, and the Flutter component is configured to parse the microprogram component and load an interface of the microprogram component; and constructing an application on the first platform and generating an application package, based on the project template of the cross-platform application and the information about the microprogram component;

the method further comprises: obtaining a native component corresponding to the project template of the cross-platform application, wherein the constructing an application on the first platform based on the project template of the cross-platform application and the information about the microprogram component comprises: constructing the application on the first platform based on the project template of the cross-platform application, the information about the microprogram component, and the native component;

wherein for a cross-platform application running on an Android system, the obtaining a project template of the cross-platform application and information about a microprogram component corresponding to the project template of the cross-platform application; and constructing an application on the first platform and generating an application package, based on the project template of the cross-platform application and the information about the microprogram component comprises:
- obtaining and modifying a project template file of the project template of the cross-platform application, and writing a native component dependency parameter;
- writing a name of the cross-platform application, obtaining a file of a home interface of the cross-platform application, and modifying a name of the file of the home interface;
- extracting and downloading a Flutter component dependency, and writing a microprogram component dependency parameter; and
- constructing the application and generating the application package.

2. The method according to claim 1, wherein the microprogram component is a component in a format of an abstract syntax tree.

3. The method according to claim 1, wherein the obtaining the project template of the cross-platform application comprises: invoking a cross-platform application script; and searching for the project template of the cross-platform application.

4. The method according to claim 1, wherein the obtaining the project template of the cross-platform application comprises:
- invoking a cross-platform application script; and
- searching for the project template of the cross-platform application from a second platform,
- wherein the second platform is different from the first platform, and the project template of the cross-platform application belongs to the second platform.

5. The method according to claim 1, wherein the obtaining the project template of the cross-platform application and information about a microprogram component corresponding to the project template of the cross-platform application, in response to an operation of selecting the project template of the cross-platform application by a user on a first platform comprises:
- in response to an operation of the user selecting information of the project template of the cross-platform application displayed on an interface of the first platform, obtaining the project template of the cross-platform application; and
- in response to an operation of the user selecting the information about the microprogram component displayed on an interface of the first platform, obtaining the information about the microprogram component corresponding to the project template of the cross-platform application.

6. The method according to claim 5, wherein the in response to an operation of the user selecting the project template of the cross-platform application displayed on an interface of the first platform, obtaining the project template of the cross-platform application comprises:
- in response to the operation of the user selecting information of the project template of the cross-platform application displayed on the interface of the first platform, selecting the project template of the cross-platform application from a second platform, wherein the second platform is different from the first platform, and the project template of the cross-platform application belongs to the second platform.

7. The method according to claim 5, wherein the in response to an operation of the user selecting the information about the microprogram component displayed on an interface of the first platform, obtaining the information about the microprogram component corresponding to the project template of the cross-platform application comprises:
- in response to the operation of the user selecting the information about the microprogram component displayed on the interface of the first platform, obtaining the information of the microprogram component corresponding to the project template of the cross-platform application from a second platform, wherein the second platform is different from the first platform, and the project template of the cross-platform application belongs to the second platform.

8. The method according to claim 1, wherein the obtaining the native component corresponding to the project template of the cross-platform application comprises:
- searching and obtaining the native component from a second platform, wherein the second platform is different from the first platform, and the project template of the cross-platform application belongs to the second platform.

9. The method according to claim 8, wherein the obtaining the native component corresponding to the project template of the cross-platform application comprises:
- displaying a list of pre-stored native components on the first platform; and
- obtaining the native component, in response to an operation of the user selecting the native component from the list of native components.

10. A method for running a cross-platform application, applied to a terminal, comprising:
- downloading and installing an application package to generate an application, in response to an operation on the application package from a user, wherein the application package is constructed based on a project template of the cross-platform application, information about a microprogram component corresponding to the project template of the cross-platform application, and a native component corresponding to the project template of the cross-platform application, and the project template of the cross-platform application comprises a Flutter component based on a domain-specific language;
- running the application on the terminal, and loading an application interface of the application; and
- in response to an operation on a microprogram control unit displayed on the application interface from the user, downloading, by the Flutter component, the microprogram component based on the information about the microprogram component, parsing the microprogram component and loading an interface of the microprogram component;
- wherein for a cross-platform application running on an Android system, when the application package is constructed based on a project template of the cross-platform application, information about a microprogram component corresponding to the project template of the cross-platform application, and a native component corresponding to the project template of the cross-platform application, a server performs:
  - obtaining and modifying a project template file of the project template of the cross-platform application, and writing a native component dependency parameter;

writing a name of the cross-platform application, obtaining a file of a home interface of the cross-platform application, and modifying a name of the file of the home interface;

extracting and downloading a Flutter component dependency, and writing a microprogram component dependency parameter; and constructing the application and generating the application package.

11. The method according to claim 10, wherein the information about the microprogram component is comprised in an entrance configuration file, and the method further comprises:

when running the application on the terminal, parsing, by the Flutter component, the entrance configuration file and loading a home interface of the application.

12. The method according to claim 10, wherein the microprogram component is a component in a format of an abstract syntax tree.

13. A method for implementing a cross-platform application, comprising:

obtaining a project template of the cross-platform application and information about a microprogram component corresponding to the project template of the cross-platform application, in response to an operation of selecting the project template of the cross-platform application by a user on a first platform, wherein the project template of the cross-platform application comprises a Flutter component based on a domain-specific language;

constructing an application on the first platform and generating an application package, based on the project template of the cross-platform application and the information about the microprogram component;

downloading and installing the application package to generate the application, in response to an operation on the application package from the user;

running the application, and loading an application interface of the application; and in response to an operation on a microprogram control unit displayed on the application interface from the user, downloading, by the Flutter component, the microprogram component based on the information about the microprogram component, parsing the microprogram component and loading an interface of the microprogram component;

the method further comprises: obtaining a native component corresponding to the project template of the cross-platform application, wherein the constructing an application on the first platform based on the project template of the cross-platform application and the information about the microprogram component comprises: constructing the application on the first platform based on the project template of the cross-platform application, the information about the microprogram component, and the native component;

wherein for a cross-platform application running on an Android system, the obtaining a project template of the cross-platform application and information about a microprogram component corresponding to the project template of the cross-platform application; and constructing an application on the first platform and generating an application package, based on the project template of the cross-platform application and the information about the microprogram component comprises:

obtaining and modifying a project template file of the project template of the cross-platform application, and writing a native component dependency parameter;

writing a name of the cross-platform application, obtaining a file of a home interface of the cross-platform application, and modifying a name of the file of the home interface;

extracting and downloading a Flutter component dependency, and writing a microprogram component dependency parameter; and constructing the application and generating the application package.

14. A server, comprising: a memory, a processor, and a program stored on the memory and executable on the processor, wherein, when executing the program, the processor is configured to perform steps of the method according to claim 1.

15. The server according to claim 14, wherein the microprogram component is a component in a format of an abstract syntax tree.

16. A terminal, comprising: a memory, a processor, and a program stored on the memory and executable on the processor, wherein, when executing the program, the processor is configured to perform steps of the method according to claim 10.

17. A system for implementing a cross-platform application, comprising a memory, a processor, and a program stored in the memory and capable of running on the processor, wherein, when the program is executed, the processor is configured to perform steps of the method according to claim 13.

18. A non-transitory computer-readable storage medium, wherein a computer program is stored thereon, wherein the program, when executed by a processor, causes the processor to implement steps of the method according to claim 1.

* * * * *